United States Patent
Topliss et al.

(10) Patent No.: US 8,446,475 B2
(45) Date of Patent: *May 21, 2013

(54) SHAPE MEMORY ALLOY ACTUATION APPARATUS

(75) Inventors: Richard Topliss, Cambridge (GB); Dominic George Webber, Cambridge (GB); Robert John Leedham, Cambridge (GB); Anthony Hooley, Cambridge (GB); David Charles William Richards, Cambridge (GB); Thomas Matthew Gregory, Cambridge (GB)

(73) Assignee: Cambridge Mechatronics Limited, Cambridge (GB)

( * ) Notice: Subject to any disclaimer, the term of this patent is extended or adjusted under 35 U.S.C. 154(b) by 787 days.

This patent is subject to a terminal disclaimer.

(21) Appl. No.: 12/525,906

(22) PCT Filed: Feb. 11, 2008

(86) PCT No.: PCT/GB2008/000478
§ 371 (c)(1),
(2), (4) Date: Nov. 13, 2009

(87) PCT Pub. No.: WO2008/099156
PCT Pub. Date: Aug. 21, 2008

(65) Prior Publication Data
US 2010/0060776 A1    Mar. 11, 2010

(30) Foreign Application Priority Data

| Feb. 12, 2007 | (GB) | 0702674.3 |
| Feb. 12, 2007 | (GB) | 0702676.8 |
| Apr. 23, 2007 | (GB) | 0707788.6 |
| Apr. 27, 2007 | (GB) | 0708214.2 |
| May 15, 2007 | (GB) | 0709338.8 |
| Aug. 23, 2007 | (GB) | 0716469.2 |
| Sep. 26, 2007 | (GB) | 0718828.7 |

(51) Int. Cl.
H04N 5/228    (2006.01)
H04N 5/225    (2006.01)
G03B 13/00    (2006.01)

(52) U.S. Cl.
USPC ....... 348/208.11; 348/345; 348/357; 348/374

(58) Field of Classification Search ............. 348/207.99, 348/208.11, 345, 357, 373, 374; 396/79, 396/85, 93, 102, 130; 60/527–529
See application file for complete search history.

(56) References Cited

U.S. PATENT DOCUMENTS 4,930,494 A * 6/1990 Takehana et al. ............. 600/145
(Continued)

FOREIGN PATENT DOCUMENTS

EP    0 841 510 A1    5/1998
(Continued)

OTHER PUBLICATIONS

International Search Report for PCT/GB2008/000478, mailed Sep. 24, 2008.
(Continued)

Primary Examiner — Lin Ye
Assistant Examiner — Euel Cowan
(74) Attorney, Agent, or Firm — Nixon & Vanderhye, P.C.

(57) ABSTRACT

A miniature camera lens actuation apparatus comprises a support structure, a camera lens element supported on the support structure by a suspension system; and an SMA actuator connected between the support structure and the movable element to drive movement of the camera lens element. The control circuit may include a drive circuit and a sensor circuit which have separate electrical connections to the SMA actuator to reduce the impact of the resistance of the electrical connections on the sensing. The control circuit may vary the drive signal in response to a temperature signal indicative of the ambient temperature. An endstop limits movement to prevent extension of the SMA actuator in its unheated state beyond a maximum length which is at or below the length corresponding the local maximum resistance of the resistance-length curve. Control of position is effected using resistance of the SMA actuator as a measure of position. The control employs a 'ratcheting' method to prevent a failure condition and an initial calibration step to derive a range of target resistance values. In manufacture, the position of a lens holder is adjusted relative to a carrier to provide focussing on the image sensor of an image of an object at a distance in the range from infinity to the hyperfocal distance when the SMA actuator is heated to a predetermined temperature greater than ambient temperature.

9 Claims, 14 Drawing Sheets

U.S. PATENT DOCUMENTS

| | | | |
|---|---|---|---|
| 4,977,886 | A | 12/1990 | Takehana et al. |
| 5,150,702 | A | 9/1992 | Miyanaga et al. |
| 5,459,544 | A | 10/1995 | Emura |
| 5,763,979 | A | 6/1998 | Mukherjee et al. |
| 6,157,779 | A | 12/2000 | Kosaka et al. |
| 6,307,678 | B2 | 10/2001 | Kosaka et al. |
| 6,434,333 | B2 | 8/2002 | Tanaka et al. |
| 6,434,932 | B2 | 8/2002 | Hara et al. |
| 6,449,434 | B1 | 9/2002 | Fuss |
| 6,516,146 | B1 | 2/2003 | Kosaka |
| 6,554,501 | B2 | 4/2003 | Kosaka et al. |
| 6,574,958 | B1 | 6/2003 | MacGregor |
| 6,833,656 | B2 | 12/2004 | Hooley et al. |
| 6,945,045 | B2 | 9/2005 | Hara et al. |
| 7,068,930 | B2 | 6/2006 | McKevitt et al. |
| 7,224,813 | B2 | 5/2007 | Hooley et al. |
| 7,295,389 | B2 | 11/2007 | Ohtsuka et al. |
| 2001/0002226 | A1 | 5/2001 | Tanaka et al. |
| 2001/0025477 | A1 | 10/2001 | Hara et al. |
| 2002/0001467 | A1 | 1/2002 | Tanaka et al. |
| 2002/0113499 | A1 | 8/2002 | von Behrens et al. |
| 2006/0048511 | A1 | 3/2006 | Everson et al. |
| 2006/0067658 | A1 | 3/2006 | Wirt |
| 2006/0098968 | A1 | 5/2006 | Ito et al. |
| 2006/0109570 | A1* | 5/2006 | Ohtsuka et al. ............. 359/819 |
| 2006/0120708 | A1 | 6/2006 | Kosaka et al. |
| 2006/0150627 | A1 | 7/2006 | Oohara |
| 2006/0185359 | A1 | 8/2006 | Hamaguchi et al. |
| 2006/0209195 | A1 | 9/2006 | Goto |
| 2006/0266031 | A1 | 11/2006 | Kosaka et al. |
| 2006/0272328 | A1 | 12/2006 | Hara et al. |
| 2007/0047938 | A1 | 3/2007 | Suzuki et al. |
| 2007/0058070 | A1* | 3/2007 | Chen ............................ 348/340 |
| 2007/0294873 | A1 | 12/2007 | Bogursky et al. |
| 2008/0278030 | A1 | 11/2008 | Hara et al. |
| 2008/0278590 | A1 | 11/2008 | Tanimura et al. |
| 2008/0282696 | A1 | 11/2008 | Wada et al. |
| 2009/0009656 | A1 | 1/2009 | Honda et al. |
| 2009/0046194 | A1* | 2/2009 | Sladen .......................... 348/335 |
| 2009/0295986 | A1 | 12/2009 | Topliss et al. |
| 2010/0074607 | A1 | 3/2010 | Topliss et al. |
| 2010/0074608 | A1 | 3/2010 | Topliss |
| 2010/0275592 | A1 | 11/2010 | Topliss et al. |
| 2010/0283887 | A1 | 11/2010 | Topliss et al. |
| 2011/0317013 | A1* | 12/2011 | Gutierrez et al. ............. 348/143 |

FOREIGN PATENT DOCUMENTS

| | | |
|---|---|---|
| EP | 1 626 177 A1 | 2/2006 |
| EP | 1 640 757 | 3/2006 |
| EP | 1 640 757 A1 | 3/2006 |
| EP | 1 666 216 A1 | 6/2006 |
| EP | 1 914 422 | 4/2008 |
| EP | 2 239 610 A1 | 10/2010 |
| GB | 2 398 854 A | 9/2004 |
| GB | 2 434 214 | 7/2007 |
| JP | 61-229977 | 10/1986 |
| JP | 9-127398 | 5/1997 |
| JP | 2002-99019 | 4/2002 |
| JP | 2002/130114 | 5/2002 |
| JP | 2004-38058 | 2/2004 |
| JP | 2009/122602 | 6/2004 |
| JP | 2004-212882 | 7/2004 |
| JP | 2004-333995 A | 11/2004 |
| JP | 2005-195998 | 7/2005 |
| JP | 2005-275270 | 10/2005 |
| JP | 2006-330542 | 12/2006 |
| JP | 2007-060530 A | 3/2007 |
| JP | 2007-315352 | 12/2007 |
| JP | 2009/086142 | 4/2009 |
| JP | 2009-122602 A | 6/2009 |
| WO | WO 94/19051 | 9/1994 |
| WO | WO 01/47041 | 6/2001 |
| WO | WO 02/103451 | 12/2002 |
| WO | WO 03/048831 | 6/2003 |
| WO | WO 2005/003834 A1 | 1/2005 |
| WO | WO 2005/026539 | 3/2005 |
| WO | WO2005/075823 | 8/2005 |
| WO | WO 2005/093510 A2 | 10/2005 |
| WO | WO2006/054535 | 5/2006 |
| WO | WO 2006/059098 | 6/2006 |
| WO | WO 2006/061623 A1 | 6/2006 |
| WO | WO 2006/105588 | 10/2006 |
| WO | WO2007/018086 | 2/2007 |
| WO | WO 2007/113478 | 10/2007 |
| WO | WO 2008/099155 A1 | 8/2008 |
| WO | WO 2008/129290 A1 | 10/2008 |
| WO | WO 2008/129291 A2 | 10/2008 |
| WO | WO 2009/096207 A1 | 8/2009 |

OTHER PUBLICATIONS

Written Opinion of the International Searching Authority for PCT/GB2008/000478, mailed Sep. 24, 2008.

International Search Report for PCT/GB2007/001050 mailed Aug. 30, 2007.

Written Opinion of the International Searching Authority for PCT/GB2007/001050 mailed Aug. 30, 2007.

International Search Report for PCT/GB2008/003657 mailed May 27, 2009.

Written Opinion of the International Searching Authority for PCT/GB2008/003657 mailed May 27, 2009.

U.S. Appl. No. 13/056,928, filed Apr. 11, 2011.

International Search Report for PCT/GB2009/001853 mailed Mar. 29, 2011.

* cited by examiner

SHAPE MEMORY ALLOY ACTUATION APPARATUS

This application is the U.S. national phase of International Application No. PCT/GB2008/000478, filed 11 Feb. 2008, which designated the U.S. and claims priority to GB Application No. 0702676.8 filed 12 Feb. 2007; GB Application No. 0702674.3 filed 12 Feb. 2007; GB Application No. 0707788.6 filed 23 Apr. 2007; GB Application No. 0708214.2 filed 27 Apr. 2007; GB Application No. 0709338.8 filed 15 May 2007; GB Application No. 0716469.2 filed 23 Aug. 2007; and GB Application No. 0718828.7 filed 26 Sep. 2007, the entire contents of each of which are hereby incorporated by reference.

The present invention relates to a shape memory alloy (SMA) actuation apparatus using SMA material as an actuator to drive movement of a movable element.

The present invention has particular application to actuation of a camera lens element, for example of the type used in a miniature camera which may be employed in a portable electronic device such as a mobile telephone or a mobile digital data processing and/or transmitting device.

In recent years, with the explosive spread of portable information terminals sometimes known as PDAs (portable digital assistants) and portable telephones, an increasing number of devices incorporate a compact digital camera apparatus employing an image sensor. When such a digital camera apparatus is miniaturized using an image sensor with a relatively small image-sensing area, its optical system, including one or more lenses, also needs to be miniaturized accordingly.

To achieve focusing or zooming, an actuation arrangement of some type must be included in the confined volume of such a miniature camera to drive movement of the camera lens element along the optical axis. As the camera lens element is small, the actuation arrangement must be capable of providing precise actuation over a correspondingly small range of movement. At the same time it is desired that the actuator arrangement is itself compact given the desire for miniaturization of the camera apparatus as a whole. In practical terms, these points limit the types of actuation arrangement which can be applied.

Similar considerations apply to actuation arrangements for a wide range of other small objects.

Whilst most of the existing cameras rely on variations of the well-known electric-coil motor, a number of other actuation arrangements have been proposed as small drive units for the lens system. Such other actuation arrangements may include transducers based on piezoelectric, electrostrictive or magnetostrictive material, commonly referred to as electroactive devices and one example is an actuator comprising a curved structure of helically coiled piezoelectric bender tape as disclosed in WO-01/47041 which may be used as an actuator for a camera lens as described in WO-02/103451.

Another type of actuation arrangement which has been proposed uses SMA material as an actuator. The SMA actuator is arranged on heating to drive movement of the camera lens element. Actuation may be achieved by control of the temperature of the SMA actuator over an active temperature range in which the SMA actuator changes between martensite and austenite phases in which the stress and strain of the SMA actuator changes. At low temperatures the SMA actuator is in the martensite phase, whereas at high temperatures the SMA actuator transforms into the austenite phase which induces a deformation causing the SMA actuator to contract. The temperature of the SMA actuator may be changed by selectively passing a current through the SMA actuator to heat it causing the phase change. The phase change occurs over a range of temperature due to the statistical spread of transition temperature in the SMA crystal structure. The SMA actuator is arranged so that the contraction drives movement of the movable element.

The use of SMA material as an actuator for a small object such as the camera lens element of a miniature camera provides the advantages of being intrinsically linear, providing a high power per unit mass, being a low cost commodity item and being a relatively small component.

Despite these theoretical advantages of the use of SMA material as an actuator, in practice limitations imposed by the nature of SMA material make it difficult to design and manufacture SMA actuators, particularly in a miniature device.

The first and second aspects of the present invention are concerned with increasing the lifetime of the SMA actuator.

According to the first aspect of the present invention, there is provided a method of controlling a camera lens actuation apparatus comprising an SMA actuator arranged on heating to drive movement of a camera lens element along the optical axis to change the focus of the camera lens element on an image sensor, the SMA actuator having a property that resistance varies with length along a curve on which the resistance decreases from a local maximum resistance to a local minimum resistance during contraction, wherein during the method the SMA actuator is heated by passing a current therethrough and the movement of the camera lens element is controlled by measuring the resistance of the SMA actuator and varying the current using the measured resistance of the SMA actuator as a feedback signal to drive the measured resistance to a desired value, the method comprising:

performing a preliminary calibration operation comprising heating the SMA actuator and monitoring its measured resistance to detect the local maximum resistance and the minimum local resistance, and deriving and storing a resistance range magnitude equal to or less than the difference between the resistance value of the detected local maximum resistance and the resistance value of the detected local minimum resistance; and performing, more frequently than the preliminary calibration operation, a focus detection operation comprising:

heating the SMA actuator and monitoring its resistance to detect the local maximum resistance;

deriving an upper target resistance value at or predetermined decrement below the resistance value of the detected local maximum resistance, and a lower target resistance value equal to the upper target resistance value less the stored resistance range magnitude;

heating the SMA actuator so that the measured resistance varies from the upper target resistance value to the lower target resistance value, monitoring the quality of focus of the image signal output by the image sensor, and storing the resistance value at which the quality of focus is at an acceptable level.

Further according to the first aspect of the present invention, there is provided a control system implementing a similar method.

The first aspect of the present invention relates to a control technique in which a calibration operation is performed in which the SMA material is heated to detect the local maximum and minimum resistances and to derive therefrom upper and lower target resistances used in a subsequent focus detection operation as the limits of the range of resistance over which the SMA actuator is controlled.

The first aspect of the present invention is based on an appreciation that the lifetime of the SMA actuator can be increased by decreasing the exposure of the SMA actuator to operation at the high end of its range of contraction. This is for the following reasons. At the high end of the range and in particular above the local minimum resistance, further heating can provide further contraction but the majority of the SMA material has transformed from the Martensite phase to the Austenite phase. This non-uniform effect of incomplete transition at a given temperature is due to the statistical spread of transition temperature in the SMA crystal structure. If significant further displacement is demanded from the wire past this point, the load is borne by relatively few SMA crystals. These portions of the material become relatively heavily loaded which results in damage to their structure. With repeated operation of the SMA actuator in this region, this damage may be exacerbated to the point where the wire will either fracture or perform out of specification before the desired lifetime of the SMA actuator has been reached.

The first aspect of the present invention therefore decreases the exposure of the SMA actuator to operation at the high end of its range of contraction. In particular this is achieved by performing a preliminary calibration operation to detect the local maximum resistance and the minimum local resistance. A resistance range magnitude equal to or less than the difference therebetween is then derived and stored. Thereafter, in the focus detection operation, the upper and lower target values over which the resistance is varied is derived from the resistance value of the local maximum resistance detected at the time of the focus detection operation and using the stored resistance range magnitude. Thus, during the focus detection operation, the SMA actuator is not heated beyond the local minimum resistance where the risk of damage is increased.

The preliminary calibration operation is performed less frequently than the focus detection operation. In practice, the preliminary calibration operation may be performed considerably less frequently than the focus detection operation. For example the preliminary calibration operation might be performed only when power is supplied or the apparatus is switched on, but typically the focus detection operation will be performed many times between the power being supplied and cut or between the apparatus being switched on and off. Thus, the SMA actuator is heated less frequently beyond the local minimum resistance as compared to the situation that the local minimum resistance is reached every time the focus detection operation is performed.

According to the second aspect of the present invention, there is provided a method of controlling a shape memory alloy actuation apparatus comprising an SMA actuator arranged on heating to drive movement of a movable element, the SMA actuator having a property that resistance varies with length along a curve on which the resistance decreases from a local maximum resistance to a local minimum resistance during contraction, the SMA actuator being heated by passing a current therethrough, wherein the method comprises heating the SMA actuator and measuring the resistance of the SMA actuator, the power of the current being varied using the measured resistance of the SMA actuator as a feedback signal to drive the measured resistance to a target value, and monitoring the measured resistance to detect the local minimum resistance and, in response to detection of the local resistance minimum, immediately reducing the power of the current.

Further according to the second aspect of the present invention, there is provided a control system implementing a similar method.

The second aspect of the present invention is based on an appreciation that the lifetime of the SMA actuator can be increased by decreasing the exposure of the SMA actuator to operation at the high end of its range of contraction. This is for the reasons discussed above with respect to the first aspect of the invention.

The second aspect of the present invention therefore decreases the exposure of the SMA actuator to operation at the high end of its range of contraction. This is done by monitoring the measured resistance to detect the local minimum resistance. When the local resistance minimum is detected, the power of the current is immediately reduced. Subsequently target values below the local minimum resistance are not sought. Thus the extent to which the SMA actuator is heated at or beyond the local resistance minimum is minimised, thereby increasing the lifetime of the SMA actuator.

Several aspects of the present invention relate to control of the position of the movable element. It is desirable to use the resistance of the SMA actuator as a measure of the position. Such use of resistance has a considerable advantage of being accurate and being straightforward and compact to implement, simply by providing additional electronic components supplementing the control circuit needed to provide the current which heats the SMA actuator. In contrast, direct measurement of the position of the movable element requires a position sensor which is bulky in the context of a miniature device. Also, measurement of the temperature of the SMA actuator is difficult to implement with sufficient accuracy.

The factors which affect the resistance of the SMA actuator are as follows. Effects which increase resistance on heating are the increase of resistivity with temperature and also that the Austenite phase has a higher resistivity than the Martensite phase. However, an opposing effect is that when the SMA actuator contracts on heating the change of geometry, involving a reduced length and increased cross-sectional area, tends to reduce resistance. This has a significantly greater effect and rapidly overcomes the effects of increasing resistivity with the result that during the major part of the contraction the resistance of the SMA actuator decreases as the temperature increases. Thus, SMA has a property that resistance varies with length along a curve on which the resistance decreases from a local maximum resistance to a local minimum resistance during contraction.

Due to this property of SMA material, control based on the measured resistance typically involves heating the SMA actuator until the local maximum resistance is detected as an indication that contraction has started to occur. Thereafter the position of the movable element may be controlled across the range of contraction of the SMA actuator using the measured resistance difference between the local maximum and minimum resistances as a measure of position, for example by using the measured resistance of the SMA actuator as a feedback signal to drive the measured resistance to a target value. This provides for accurate control of position.

The local maximum resistance provides a reliable and repeatable measure of the start of contraction for an individual actuation apparatus. This is important for applications where accurate control of position is required, for example in the case that the movable element is a camera lens element in which case the position controls the focus or zooming. By way of example, the resistance value of the local maximum may be recorded and then focal zone positions are calculated based on this resistance value. In this case, an offset is applied so that the first focal zone is at a temperature higher than the temperature at which local maximum occurred, and subsequent focal zones are offset from the first in decrements of resistance (corresponding to increments of temperature).

However, variation in the position of the movable element at the local maximum resistance causes a corresponding variation in the position of the movable element during operation. The tolerances inherent in the manufacture and assembly of the actuation apparatus result in uncertainty as to the absolute position of the movable element when the resistance of the SMA actuator is at the local maximum resistance, as between different actuation apparatuses. Although the tolerances can be improved by careful design of the actuation apparatus, the tolerances cannot ever be entirely removed.

The third aspect of the present invention is concerned with reducing this problem of the uncertain absolute position of the movable element.

According to the third aspect of the present invention, there is provided a shape memory alloy actuation apparatus comprising:

a support structure;

a movable element supported on the support structure by a suspension system which guides movement of the movable element;

a shape memory alloy actuator connected between the support structure and the movable element such that contraction of the shape memory alloy actuator on heating drives said movement of the movable element relative to the support structure, the shape memory alloy actuator having a property that resistance varies with length along a curve on which the resistance decreases from a local maximum resistance to a local minimum resistance during contraction; and an endstop arranged to limit movement of the movable element to prevent extension of the shape memory alloy actuator in its unheated state beyond a maximum length which is at or below the length corresponding on said curve to the local maximum resistance.

The endstop limits the extension of the SMA actuator. Accordingly the position of the movable element in the unheated state of the SMA actuator is fixed by the position of the endstop. This position corresponds to a length of the SMA actuator at or below the length corresponding on said curve to the local maximum resistance. Accordingly, the endstop effectively lifts the moving element to reduce the strain of the SMA actuator. During heating of the SMA actuator the phase transformation initially occurs without causing contraction driving movement of the movable element, until there is sufficient stress in SMA actuator to move the movable element off the endstop. Thereafter movement is driven as though the endstop is not present. This arrangement has the benefit that the starting position of the range of movement of the movable element is controlled by the position of the endstop. The endstop may be positioned so that the length of the SMA actuator is at or below the length corresponding on said curve to the local maximum resistance for the maximum overall tolerance on the position of the movable element relative to the support structure. As the endstop may be positioned with a relatively good tolerance, this greatly improves the tolerances on the absolute starting position of the range of movement of the movable element.

However, variation in the position of the movable element at the time of detecting the local maximum resistance causes a corresponding variation in the position of the movable element during subsequent operation. This can result in variable positional control, particularly at high ambient temperatures when the position of the movable element corresponding to the local maximum resistance may vary.

In addition, there is a risk that the ambient temperature is high enough that the resistance has already passed the local maximum. In this case, the position of the first positional zone (focal zone in the case of a camera lens element) will alter. This means that over a temperature range, the controllable positions can alter in terms of the absolute actuator position.

This is undesirable. For example in the case of an auto-focus algorithm for a camera lens element, where it is desired for the camera to move to the approximate far focus (infinity focus) position without referring to the image quality, this requires the actuator to be set with reasonable accuracy to an absolute position over the temperature range.

The fourth aspect of the present invention is concerned with reducing this problem of the uncertain absolute position of the movable element.

According to the fourth aspect of the present invention, there is provided a method of controlling a shape memory alloy actuation apparatus comprising an SMA actuator arranged on heating to drive movement of a movable element, the SMA actuator having a property that resistance varies with length along a curve on which the resistance decreases from a local maximum resistance to a local minimum resistance during contraction, wherein during the method the SMA actuator is heated by passing a current therethrough and the resistance of the SMA actuator is measured, the method comprising:

a first step of heating the SMA actuator and monitoring the measured resistance of the SMA actuator to detect the local minimum resistance; and a second step of varying the power of the current using the measured resistance of the SMA actuator as a feedback signal to drive the measured resistance to a target value a predetermined increment above the resistance value of the local minimum resistance.

Further according to the fourth aspect of the present invention, there is provided a control system implementing a similar method.

Thus, instead of using the resistance value of the local maximum resistance as the a reference for the target values, this aspect of the invention involves detection of the local minimum resistance and then uses this as a reference by using a target value which is a predetermined increment above the resistance value of the local minimum resistance. This has the advantage that the resistance value of the local minimum resistance used as a reference and therefore also the target value are reliable and repeatable in the sense that they do not vary with ambient temperature. This is because, it has been observed, the position of the movable element at the local minimum resistance is stable as compared to the position of the movable element at the local maximum resistance. In particular, this position does not vary with ambient temperature. This is because the temperature of the SMA at the local minimum resistance is well outside the ambient temperature range, and so the actuator position corresponding to the local minimum resistance also does not vary over the operating temperature range. This allows accurate positioning of the movable element which is advantageous in many applications. For example in the case that the movable lens element is a camera lens element this allows for accurate focus control.

The fifth aspect of the present invention is concerned with avoiding a failure condition which, it has been appreciated, can occur when controlling an SMA actuator using the measured resistance as a measure of position.

According to the fifth aspect of the present invention, there is provided a method of controlling a shape memory alloy actuation apparatus comprising an SMA actuator arranged on heating to drive movement of a movable element, the SMA actuator having a property that resistance varies with length along a curve on which the resistance decreases from a local maximum resistance to a local minimum resistance during contraction, wherein during the method the SMA actuator is heated by passing a current therethrough and the resistance of the SMA actuator is measured, the method comprising:

a first step of heating the SMA actuator and monitoring the measured resistance of the SMA actuator to detect the local maximum resistance;

on detection of the local maximum resistance, a second step of varying the current using the measured resistance of the SMA actuator as a feedback signal to drive the measured resistance to a target value a predetermined decrement below the resistance value of the detected local maximum resistance; and simultaneously with said second step monitoring the supplied current and the measured resistance to detect the condition that a decrease in the supplied current is accompanied by the measured resistance decreasing and in response to detecting that condition reverting to the first step.

Further according to the fifth aspect of the present invention, there is provided a control system implementing a similar method.

The first step involves heating of the SMA actuator until the local maximum resistance is detected. This is used as an indication that contraction has started to occur. Thereafter the position of the movable element may be controlled across the range of contraction of the SMA actuator using the measured resistance difference, between the local maximum and minimum resistances, as a measure of position, in particular by using the measured resistance as a feedback signal to drive the measured resistance to a target value. This provides for accurate control of position. Thus the second step involves setting an initial target value a predetermined decrement below the detected local maximum resistance.

However, it has been appreciated that this control can in some circumstances result in a failure condition. In particular the failure condition is that the control loop using the measured resistance as the feedback signal causes the current to be reduced until the SMA actuator is cooled to its minimum level in an attempt to reach the target value.

The reason for this failure condition has been understood as follows. The equilibrium position of the SMA actuator in its unheated state is generally thought of as a fixed position. For example in the common case that the actuation apparatus incorporates a biassing arrangement acting against the SMA actuator the rest position is taken to be the position where the forces generated in the SMA actuator and the biassing arrangement are balanced.

However in fact the rest position can be affected by vibration or impacts of the actuation apparatus. In particular such external forces can sometimes have the effect of stretching the SMA actuator beyond its normal equilibrium position. In this circumstance the first step of heating the SMA actuator occurs properly and a local maximum resistance is detected. Thereupon, in the second step the target value a predetermined decrement below the resistance value of the detected local maximum resistance is set and in the second step the current is varied using the measured resistance of the SMA actuator as a feedback signal.

The failure condition occurs when the target value in the second step is greater than the resistance value of the local maximum resistance which would have occurred if the SMA actuator had not been stretched beyond its normal equilibrium position. This is the case if the degree of stretching is sufficiently great relative to the predetermined decrement used to derive the target value. In this case, in the second step, initially the current is applied to heat the SMA actuator causing the expected decrease in resistance because the heating causes the SMA actuator to contract. However, as the target value is approached, or with a typical control loop overshoot, the current is reduced. Normally this would cause the expected behaviour of causing the measured resistance to reach the target value.

However in the case mentioned above that the SMA actuator is still stretched beyond its normal equilibrium position there is still a contraction of the SMA actuator causing a reduction in the measured resistance even when the power is increased. This may prompt the power to be reduced further. Ultimately the control reaches the failure condition mentioned above that the SMA actuator is cooled to its minimum level.

To avoid this failure condition, during the second step the supplied current and the measured resistance are monitored to detect the condition that a decrease in the supplied current is accompanied by the measured resistance decreasing. This is indicative of the condition discussed above that the SMA actuator is still stretched beyond its normal equilibrium position at the target value of measured resistance. In that case the control reverts to the first step. Thus current is applied again to heat the SMA actuator until a new local maximum resistance is detected. Now the SMA contracts further, and from a length closer to the equilibrium position.

The failure condition is therefore avoided by the first and second steps being repeated until such time as the SMA actuator has contracted below the equilibrium position. Thereafter operation is continued as normal.

The sixth aspect of the present invention relates to the specific case that the movable element is a camera lens element intended to provide a focussing operation.

In the case of such a camera lens element the range of movement provides the range of focus. Typically the SMA actuator drives movement of the camera lens element away from the sensor element. Thus the initial position of the range of movement of the camera lens element is in principle designed to provide far-field focussing, for example in which the image of an object in the range from infinity to the hyperfocal distance is focussed on the image sensor.

However, the tolerances inherent in the manufacture and assembly of the actuation apparatus result in uncertainty as to the absolute position of camera lens element when the resistance of the SMA actuator is at the local maximum resistance, as between different actuation apparatuses. Although the tolerances can be improved by careful design of the actuation apparatus, the tolerances cannot ever be entirely removed. This it is difficult to correctly set the focussing of the camera lens actuation apparatus.

The sixth aspect of the present invention is concerned with reducing this problem of properly setting the focus.

According to the sixth aspect of the present invention, there is provided a method of manufacturing a camera lens actuation apparatus comprising:

assembling: a support structure arranged to mount an image sensor at a predetermined position; a camera lens element comprising a carrier supported on the support structure by a suspension system which guides movement of the carrier along the optical axis of the camera lens element, and a lens holder holding at least one lens mounted to the carrier in a manner allowing adjustment of the position of the lens holder relative to the carrier; and a shape memory alloy actuator connected between the support structure and the camera lens element and arranged on contraction due to heating to drive said movement of the camera lens element away from said predetermined position; and adjusting the position of the lens holder relative to the carrier to provide focussing by the at least one lens on the image sensor of an image of an object at a distance in the range from infinity to the hyperfocal distance when the SMA actuator is heated to a predetermined temperature greater than ambient temperature.

Thus the sixth aspect of the invention uses a camera lens element comprising a carrier supported by the suspension system, and a lens holder mounted to the carrier in a manner allowing adjustment of the position of the lens holder relative to the carrier. This allows adjustment of the focussing provided by the camera lens element after assembly of the actuation apparatus. Such adjustment allows the focussing to be properly set despite manufacturing tolerances causing positional variations of the camera lens element relative to the support structure as between different actuation apparatuses.

However it has been appreciated that a further consideration applies when using an SMA actuator. In particular, potential problems arise due to the fact that actuation is driven by change in temperature of the SMA actuator. This means that high ambient temperatures during use of the actuation apparatus can cause the SMA actuator to contract in its unheated state as compared to its state during manufacture. If the far-field focus is set on the basis of the temperature during manufacture, this can result during use at a higher ambient temperature in loss of part of the range of focus adjacent the far-field focus. However this problem is tackled in the sixth aspect of the invention by performing the adjustment of the position of the lens holder relative to the carrier to provide a far-field focus when the SMA actuator is heated to a predetermined temperature greater than ambient temperature. This may be achieved by actually heating the SMA actuator when performing the adjustment or performing the adjustment having regard to the fact that the SMA actuator will contract on such heating. As a result, focussing may be achieved across a range extending all the way to the far-field focus in all expected ambient temperatures.

When using the resistance of the SMA actuator as a measure of the position control circuit supplies a drive signal to the SMA actuator and includes a sensor circuit to detect a measure of the resistance of the SMA actuator. However, there is a problem associated with the electrical connections between the control circuit and the SMA actuator. In particular such electrical connections have an electrical resistance which decreases the accuracy of the measurement of resistance. This is particularly so in some application areas (e.g. optical applications or other precision applications) where it is undesirable to solder the electrical terminals of the SMA actuator device to the substrate of the application because of either potential damage caused by heating during the soldering process, or because of flux emissions caused by the soldering process. In such applications it is known to electrically connect to electrical terminals using conductive adhesive (e.g. silver filled epoxy) as the electrical connection, instead of solder. However, such conductive glue connections have variable and quite large electrical resistance compared to solder connections, and the resistance of such connections can have a significant temperature coefficient as well. When implementing positional control based on resistance measurements for precision actuation, the variable and temperature dependent glue joint resistance causes significant problems of actuator precision.

According to the seventh aspect of the present invention, there is provided a shape memory alloy actuator; and
a control circuit comprising:
a drive circuit having electrical connections to the shape memory alloy actuator and operable to pass a drive signal through the shape memory alloy wire for causing the shape memory alloy wire to contract; and
a sensor circuit having electrical connections to the shape memory alloy actuator which are separate from the electrical connections of the drive circuit and across which the sensor circuit is arranged to detect a voltage, the control circuit being arranged to control the drive signal passed by the shape memory alloy on the basis of the voltage detected by the sensor circuit.

By connecting the sensor circuit to the shape memory alloy actuator by separate electrical connections from the drive circuit, and using a sensor circuit which detects a voltage, the impact of the resistance of the electrical connections can be significantly reduced. In particular, the sensor circuit can easily and conveniently be designed to draw currents which are smaller than the drive current. In this way the voltage dropped across the electrical connections is reduced, typically to a significant extent. Thus precision positional control of the SMA actuator is achieved, even in the presence of variable and potentially high-resistance electrical connections.

The eighth aspect of the present invention is concerned with a camera lens actuation apparatus in which the control system is arranged to supply a drive signal which is selectively a first drive signal which does not heat the shape memory alloy actuator sufficiently to cause contraction and a second drive signal which heats the shape memory alloy actuator sufficiently to cause contraction. This is a basic control system which is intended to drive the camera lens element to two positions and perhaps to a limited number of further positions also. Typically one of the positions will nominally provide a focus at infinity and the other a close-focus or "macro" focus. Such a control system has the advantage of being considerably simpler to implement than a system providing continuous variation across the range of focal positions.

It is straightforward to fix the position of the camera lens element when the SMA actuator is not contracted, by the mechanical design of the apparatus. However, the apparatus suffers from the problem of variability of the position of the camera lens element when the second drive signal heats the shape memory alloy actuator sufficiently to cause contraction. Even with a consistent second drive signal the SMA actuator contracts to different extents at different times.

According to the eighth aspect of the present invention, there is provided a camera lens actuation apparatus comprising:
a support structure;
a camera lens element supported on the support structure by a suspension system which guides movement of the movable element relative to the support structure along the optical axis;
a shape memory alloy actuator connected between the support structure and the movable element such that contraction of the shape memory alloy actuator on heating drives said movement of the movable element;
a control system arranged to supply a drive signal to the shape memory alloy actuator, the drive signal being selectively a first drive signal which does not heat the shape memory alloy actuator sufficiently to cause contraction and a second drive signal which heats the shape memory alloy actuator sufficiently to cause contraction, wherein the control circuit is arranged to receive a temperature signal which is indicative of the ambient temperature and to vary the second drive signal in response to the temperature signal in a manner reducing the heating as the ambient temperature increases.

It has been appreciated that significant variation in the contraction of the SMA actuator is caused by variation in the ambient temperature. This changes the rate of cooling of the SMA actuator and hence the temperature of the SMA actuator when driven by a given drive signal.

Thus use is made of a temperature signal which is indicative of the ambient temperature. In a portable electronic device such as a mobile telephone such a signal is frequently available, for example as a simple digital number representing internal ambient temperature in some arbitrary and not necessarily linearly scaled units. The second drive signal is varied in response to the temperature signal, reducing the heating as the ambient temperature increases. Thus there is achieved some degree of compensation for the variation resulting from ambient temperature variations. In practice, even using a temperature signal having coarse resolution it has been found that this allows a significant improvement in the repeatability of the positioning over a range of ambient temperatures. Furthermore, no extra complexity of the electronics of the current source is needed, only a small amount of processing by the processor controlling the current source.

The various aspects of the invention and the features thereof may be used together in any combination.

To allow better understanding, an embodiment of the present invention will now be described by way of non-limitative example with reference to the accompanying drawings, in which.

There will first be described the structure of a camera 1 incorporating an SMA actuation apparatus. The camera 1 is to be incorporated in a portable electronic device such as a mobile telephone, media player or portable digital assistant.

Figure 1:
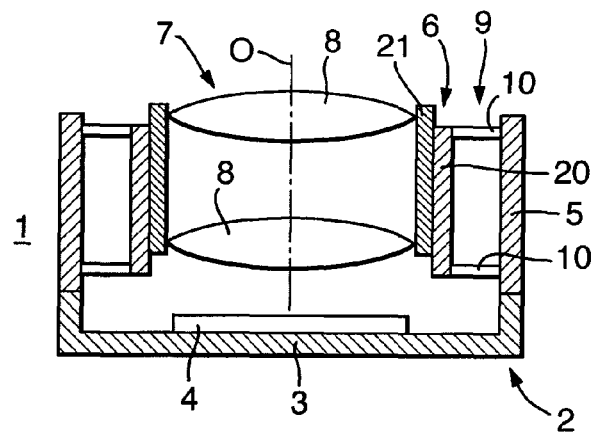
FIG. 1 is a schematic cross-sectional view of a camera incorporating an SMA actuation arrangement.

The camera 1 is shown schematically in FIG. 1. The camera 1 comprises a support structure 2 which has a base portion 3 on which there is mounted an image sensor 4 which may be CCD (charge-coupled device) or a CMOS (complimentary metal-oxide-semiconductor) device. The support structure 2 further comprises an annular wall 5 protruding from the front side of the base 3 on which the image sensor 4 is mounted. The support structure 2 may be made of plastic.

The camera 1 further comprises a lens element 6 which holds a lens system 7 consisting of one or more lenses 8. By way of example, the lens system 7 is shown in FIG. 1 as consisting of two lenses 8 but in general there may be a single lens 8 or plural lenses 8 as needed to provide the desired balance of optical performance and low cost. The camera 1 is a miniature camera with the lenses 8 of the lens system 7 typically having a diameter of at most 10 mm.

The lens element 6 is arranged with the optical axis O of the lens system 7 perpendicular to the image sensor 4. In this manner, the lens system 7 focuses light onto the image sensor 4.

The lens element 6 is suspended on the support structure 2 by a suspension system 9 consisting of two suspension elements 10 connected between the annular wall 5 of the support structure 2 and the lens element 6. The suspension system 9 guides movement of the lens element 6 along the optical axis O. Such movement of the lens element 6 changes the focus of the image formed on the image sensor 4.

Figure 2:
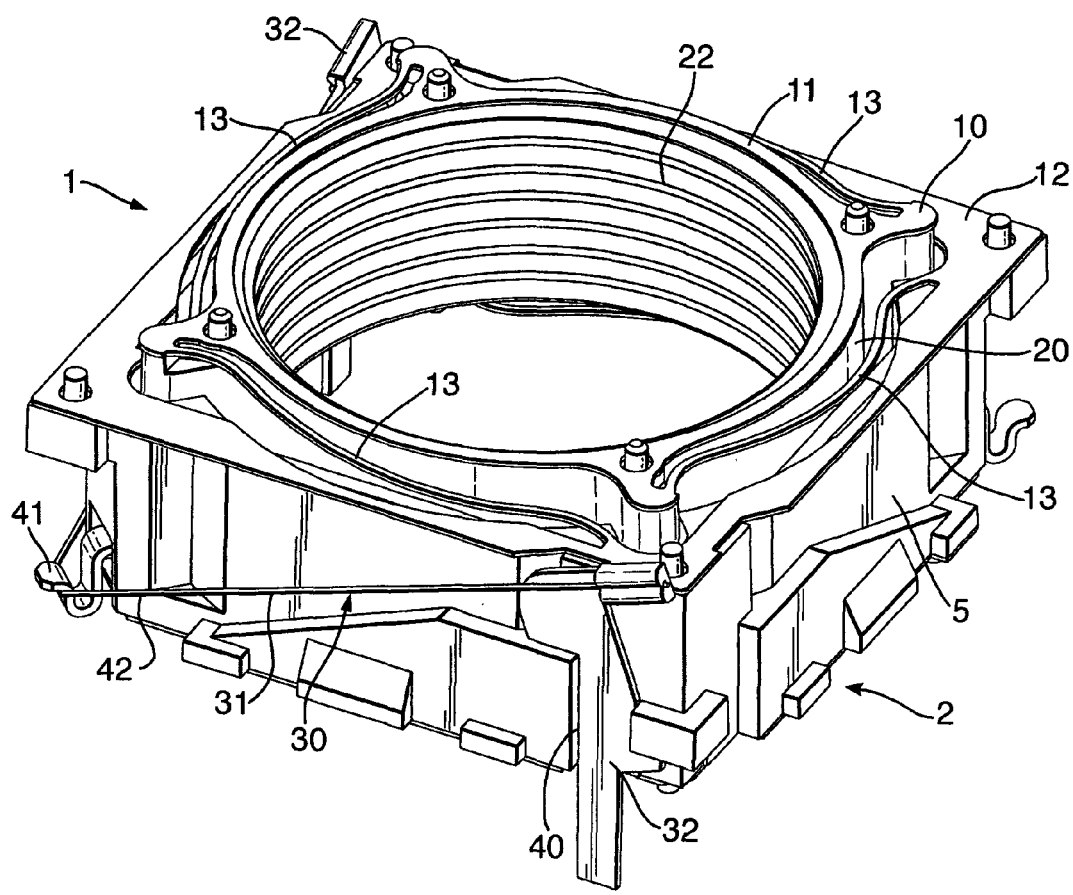
FIG. 2 is a detailed perspective view of the camera.

The detailed construction of the camera 1 will now be described with reference to FIG. 2 which is a detailed perspective view omitting the base 3 of the support structure 2.

The lens element 6 has a two-part construction comprising a lens carrier 20 and a lens holder 21 mounted inside the lens carrier 20 on an internal screw thread 22 formed inside the lens carrier 20. Typically the lens holder 21 has a diameter of 6.5 mm. Fixed to the lower rim of the lens carrier 20 is a metal ring 14 described further below. The lens carrier 20 is connected to the suspension system 9 to suspend the lens element 6. The lens holder 21 mounts the one or more lenses 8 of the lens system 7. Both the lens carrier 20 and the lens holder 21 may be made from moulded plastic.

The suspension system 9 for the lens element 6 will now be described in detail. The suspension system 9 comprises two suspension elements 10 each formed from a respective single sheet of material such as steel or beryllium copper cut into shape. One possibility is hard rolled grade 302 austenitic steel which has the advantage of providing a high yield stress. The suspension elements 10 are mounted at opposite ends of the carrier 20. Whilst only one of the suspension elements 10 is clearly visible in FIG. 2, both suspension elements 10 have an identical construction, as follows.

Each suspension element 10 comprises an inner ring 11 connected to the lens carrier 20. In particular, the inner ring 11 is connected to a respective end surface of the lens carrier 20 so that it extends around the outer circumference of the lens holder 21.

Each suspension element 10 further comprises an outer ring 12 connected to the support structure 2. In particular, the outer ring 12 extends around and is connected to the end surface of the annular wall 5 of the support structure 2.

Lastly, each suspension element 10 comprises four flexures 13 which each extend between the inner ring 11 and the outer ring 12. Thus the flexures 13 are coupled at opposite ends to the lens element 6 and the support structure 2. As viewed along the optical axis O, the flexures 13 are inclined relative to the direction radial of the optical axis O. Thus the flexures 13 extend around the optical axis. The flexures 13 are disposed around the lens carrier 20 at different radial positions with rotational symmetry around the optical axis O. Furthermore, the flexures 13 have a thickness along the optical axis O (that is the thickness of the sheet of material from which the suspension element 10 is made) which is smaller than their width in a direction perpendicular to the optical axis O. The suspension system 9 is designed with an appropriate number of flexures 13 of appropriate width, thickness and length to provide the desired degree of stiffness along the optical axis O and perpendicular thereto. The flexures 13 typically have a thickness in the range from 25 μm to 100 μm. The number of flexures 13 may be changed by varying the number of flexures 13 within a suspension element 10 and/or by providing additional suspension elements 10.

The flexures 13 are also curved along their length as viewed along the optical axis O with three regions of alternating curvature. By introducing such curvature to the flexures 13, a degree of strain relief is added to the structure. The tendency of the flexures 13 to plastically deform is reduced and instead the flexures 13 have a tendency to bend elastically. By introducing the outer regions having opposite curvature to the central region, the force imbalance is reduced and the stress developed at the joints with the inner ring 11 and outer ring 12 are reduced. Thus the flexures 13 become more compliant in the planar direction without experiencing material failure. This is achieved without an unacceptable compromise to the radial and axial stiffnesses. This allows the suspension system 9 to accommodate the displacement of the lens element 6 radially of the optical axis O caused by mechanical impacts without causing permanent damage to the flexures 13. To limit the displacement in this direction, the camera 1 is provided with a small clearance, for example of the order of 50 μm or less, between the lens element 6 and the wall 5 of the support structure 2 so that the wall 5 of the support structure 2 acts as a stop to limit the maximum displacement.

To maximize this effect the three regions of the flexures 13 preferably have unequal lengths and curvature, in particular with the central region having a greater length and a lesser curvature than the outer regions. Advantageously, the central region has a length which is at least twice the length of the outer regions, for example with the ratio of the lengths of the three regions 1:2.5:1. Advantageously, the central region has a curvature which is at most half the curvature of the outer regions, for example with the ratio of length to curvature of each region being substantially the same so that the angles subtended by each region are substantially the same.

Optionally each flexure 13 could be modified to consist of a group of parallel flexures to allow the suspension system 9 to be made more compliant radially of the optical axis by reducing the width of each parallel flexure. The practical limitation to this technique is the minimum width to which the parallel flexures may be manufactured.

The two suspension elements 10 suspend the lens element 6 on the support structure 2 by means of the flexures 13 being coupled between the lens element 6 and the support structure 2. Due to their configuration, the flexures 13 accommodate movement of the lens element 6 along the optical axis O by flexing or bending. When the lens element 6 moves along the optical axis O, the inner rings 11 move along the optical axis O relative to the outer rings 12 with consequent bending of the flexures 13.

As the flexures 13 have a thickness parallel to the optical axis O which is smaller than their width, the flexures 13 are more compliant to bending in their thickness direction than to bending in their width direction. Accordingly, the flexures 13 provide the suspension system 9 with a lower degree of stiffness against movement of the lens element 6 relative to the support structure 2 along the optical axis O, than against movement of the lens element 6 relative to the support structure 2 perpendicular to the optical axis O.

Furthermore, the two suspension elements 10 are spaced apart along the optical axis O and thus the resistance to movement of the lens element 6 perpendicular to the optical axis O also provides resistance to tilting of the lens element 6. Such resistance to off-axis movement and tilting of the lens element 6 is desirable because such off-axis movement and tilting can degrade the optical performance of the lens system 7 in focussing an image on the image sensor 4.

Figure 3:
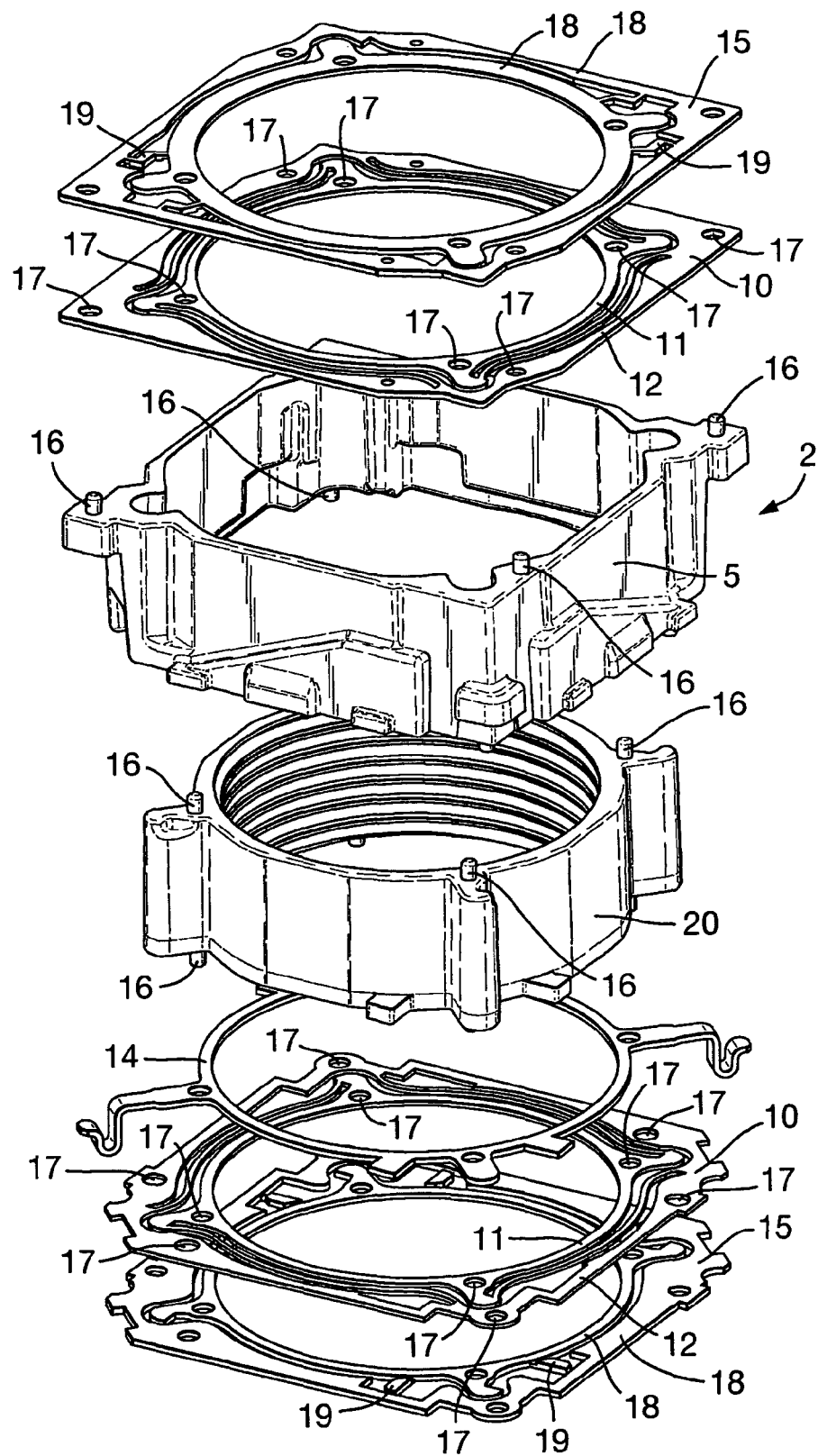
FIG. 3 is an exploded perspective view of part of the camera.

The support structure 2, lens carrier 20 (including the metal ring 14), the suspension elements 10 and two stiffener elements 15 are manufactured as a subassembly as will now be described with reference to FIG. 3. These components are arranged in a stack as shown in FIG. 3. Location pins 16 formed on the support structure 2 and the lens carrier 20 locate in apertures 17 formed in the suspension elements 10. While the complete stack is compressed in a jig, adhesive is dispensed onto the ends of each of the location pins 16, both on the top and bottom of the stack. The preferred adhesive is a cyanoacrylate that is also UV curable. By capillary action the adhesive soaks around the location pins 16, and bonds the different layers to the support structure 2 and the lens carrier 20. Once the adhesive has cured, the subassembly can be removed from the jig. As an alternative to adhesive, it is possible to form the joints be heat staking the location pins 16 to form a plastic head that retains the parts mechanically.

Each stiffener 15 comprises two rings 18 which respectively conform to, and stiffen, the inner ring 11 and the outer ring 12 of a suspension element. The two rings 18 are joined together by sprues 19 which are removed only after the subassembly has been assembled. The use of the sprues 19 helps assembly in terms of jigging the rings 18 of the stiffeners 15, and reduces the component count, and hence part cost. Once the sprues 19 are removed, the lens carrier 20 can be moved upwardly relative to the support structure 2 by an external load.

Figure 4:
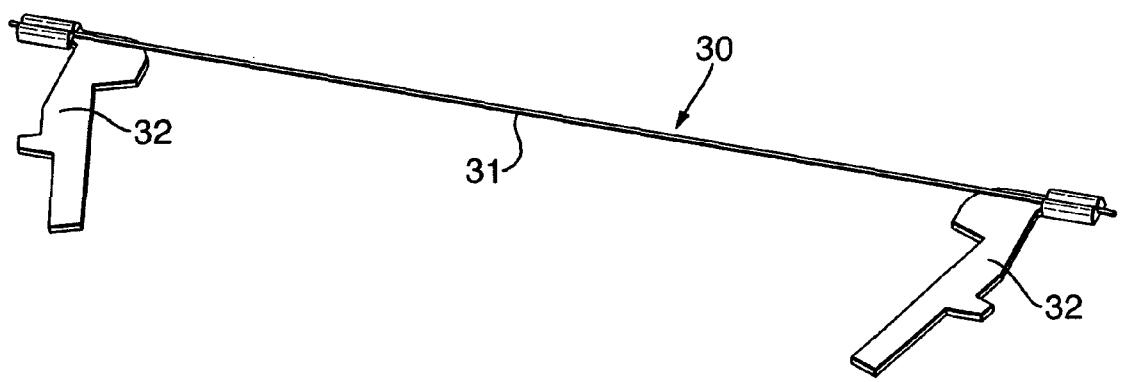
FIG. 4 is a perspective view of an SMA actuator of the camera.

In addition, the camera 1 comprises an SMA actuator 30 which is illustrated in isolation in FIG. 4. The SMA actuator 30 comprises a piece of SMA wire 31 mechanically and electrically connected at each end to a respective mounting member 32, each formed as an elongate piece of metal for example brass. In particular the mounting members 32 are each crimped over the piece of SMA wire 31. To ensure proper electrical connection, during manufacture of the SMA actuator 30 the oxide coating which forms naturally over the SMA wire 31 is removed before crimping.

During manufacture, the SMA actuator 30 is made as a subassembly separately from the remainder of the camera 1. In particular, the SMA actuator 30 is manufactured by holding the mounting members 32 in place, applying the piece of SMA wire 31 taut over the mounting members 32 and then crimping the mounting members 32 over the piece of SMA wire 31. The SMA actuator 30 is then assembled into the camera 1 in the arrangement as follows.

The two mounting members 32 are each mounted onto the outside of the annular wall 5 of the support structure 2 and are fixed in place so that to connect the piece of SMA wire 31 to the support structure 2. As shown in FIG. 2, the mounting members 32 are mounted in recesses 40 provided in the annular wall 5, for example by adhesive, swaging of the wall 5 or some other means.

Furthermore, the piece of SMA wire 31 is hooked over a retaining element 41 which is an integral part of the metal ring 14 fixed to the lens element 6 and protrudes outwardly of the lens element 6. The surface of the retaining element 41 in contact with the piece of SMA wire 31 may be curved to reduce the maximum curvature of the SMA wire.

In the camera 1, the mounting members 32 are positioned on diametrically opposite points around the optical axis O. The retaining element 41 is positioned mid-way between the two mounting members 32 around the optical axis O. As viewed along the optical axis, the lengths 42 of SMA wire 31 extend at 90° to each other along sides of the camera 1. After the assembly and in equilibrium, the piece of SMA wire 31 can be held in place with a small amount of adhesive, to ensure retention on the retaining elements 41 during operation or drop testing. This may be done after cycling of the SMA wire to help eliminate assembly tolerances.

The retaining element 41 is arranged at a position along the optical axis O which is closer to the image sensor 4 than the portion of the mounting members 32 to which the piece of SMA wire 31 is crimped. As a result, the two lengths 42 of SMA wire 31 formed by half of the piece of SMA wire 31 on either side of the retaining element 41 are held at an acute angle to the optical axis O. Slippage over the retaining element 41 during assembly assists in achieving an equal lengths and tensions for the two lengths 42 of SMA wire 31.

The lengths 42 of SMA wire 31 are held in tension in the camera 1 so that they apply a tensional force having a component along the optical axis O, in particular in a direction biasing the lens element 6 away from the image sensor 4. Thus in the absence of heating of the lengths 42 of SMA wire 31, the lens element 6 is in its closest position to the image sensor 4 within its range of movement. The camera 1 is designed so that this position corresponds to far-field or hyperfocal focus, which is the most common setting for the camera 1, particularly if an auto-focus function is provided.

In addition, each individual length 42 of SMA wire 31 applies a tensional force having a component perpendicular to the optical axis O. Some of the components of these forces are balanced by the symmetrical arrangement of the two lengths 42 of wire but there remains a net component of force radially of the optical axis O at the retaining element 41, this tending to tilt the lens element 6. However, the tilt is resisted by the suspension system 9 to be sufficiently small to be adequate for many lenses and image sensors.

The operation of the camera 1 to drive movement of the lens element 6 along the optical axis O relative to the support structure 2 will now be described.

SMA material has the property that on heating it undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus heating of the lengths 42 of SMA wire 31 causes them to decrease in length.

In the camera 1, the lengths 42 of SMA wire 31 are arranged in tension providing a net tensional force along the optical axis O between the lens element 6 and the support structure 2 in a direction moving the lens element 6 away from the image sensor 4. This force acts against the biasing force provided by the suspension system 9 in the opposite direction along the optical axis O. The flexures 13 flex depending on the tensional force from the lengths 42 of SMA wire 31. The flexures 13 as manufactured are straight as viewed radially of the optical axis O. On flexing the flexures 13 remain generally straight although some slight curvature may be generated. Thus the flexing of the flexures 13 provides biasing of the camera lens element 6 in an opposite direction from the tensional force applied by the lengths 42 of SMA wire 31. In other words the suspension system 9 provides the function of acting as a passive biassing arrangement for the lengths 42 of SMA wire 31 as well as the function of suspending and guiding movement of the camera lens element 6.

In the unheated state of the SMA wire 31 in which it is not contracted, the SMA wire 31 is in tension, thereby displacing the lens element 6 away from its rest position in the absence of the SMA wire 31. In this state, the lens element 6 is in its closest position to the image sensor 4 within its range of movement. The camera 1 is designed so that this position corresponds to far-field or hyperfocal focus, which is the most common setting for the camera 1, particularly if an auto-focus function is provided.

On heating of the lengths 42 of SMA wire 31 so that the stress therein increases, the lengths 42 of SMA wire 31 contract moving the lens element 6 away from the image sensor 4. The lens element 6 moves over a range of movement as the temperature of the SMA wire 31 increases over the range of temperature in which the transition of the material of the SMA wire from the Martensite phase to the Austenite Conversely, on cooling of the lengths 42 of SMA wire 31 so that the stress therein decreases, the biassing provided by the flexures 13 causes the lengths 42 of SMA wire 31 to expand moving the lens element 6 towards the image sensor 4.

To maximise the movement of the lens element 6 relative to the support structure 2 along the optical axis O, the total stiffness of the flexures 13 of the suspension system 9 is preferably in the range from (a) the total stiffness of the lengths 42 of SMA wire 31 experienced in the austenite phase of the SMA material to (b) the total stiffness of the lengths 42 of SMA wire 31 experienced in the martensite phase of the SMA material, more preferably the geometric mean of values (a) and (b).

It is desired that the total stiffness against movement of the lens element 6 relative to the support structure 2 along the optical axis O, provided by the sum of the stiffnesses of the flexures 13 and the lengths 42 of SMA wire 31, is sufficiently great to minimize the movement of the lens element 6 relative to the support structure 2 under gravity when the camera 1 changes between orientations. For typical lens systems the movement is desirably limited to at most 50 μm which for a typical miniature camera this means that the overall stiffness should be at least 100 N/m, preferably at least 120 N/m.

The flexures 13 are designed with an appropriate width to provide the desired stiffness against movement of the lens element 6 relative to the support structure 2 in directions perpendicular to the optical axis O, based on the extent to which the lens element 7 can accommodate off-axis motion and tilting. The stiffness of the lengths 42 of SMA wire 31 is also taken into account but usually provides a smaller contribution.

Another design consideration is to ensure that the maximum stress experienced by the flexures 13 and the lengths 42 of SMA wire 31 do not over-stress the respective materials.

The degree of displacement of the lens element 6 relative to the support structure 2 along the optical axis O is dependent on the stress developed within the lengths 42 of SMA wire 31 and also on the acute angle of the lengths 42 of SMA wire 31 with respect to the optical axis O. The strain which may be developed in an SMA wire is limited by the physical phenomenon of the phase change. Due to the acute angles of the lengths 42 of SMA wire 31 with respect to the optical axis O, the lengths 42 of the SMA wire change in orientation when they change in length. This effectively gears the movement so that the degree of displacement of the lens element 6 along the optical axis O is higher than the change in length of the lengths 42 of SMA resolved along the optical axis O. In general the acute angle may take any value but is approximately 70° in the example of FIG. 2.

The position of the lens element 6 relative to the support structure 2 along the optical axis O may be controlled by control of the temperature of the lengths 42 of SMA wire 31. In operation, heating of the lengths 42 of SMA wire 31 is provided by passing a current therethrough which provides resistive heating. Cooling is provided by ceasing the current and allowing the lengths 42 of SMA wire 31 to cool by conduction to their surroundings. The current is controlled by a control circuit 50 which is described further below.

The SMA wire 31 may be made of any suitable SMA material, for example Nitinol or another Titanium-alloy SMA material. Advantageously, the material composition and pretreatment of the piece of SMA wire 31 is chosen so that the phase change occurs over a range of temperature which is (a) above the expected ambient temperature during normal operation, typically above 70° C. and (b) as wide as possible to maximise the degree of positional control.

High speed actuation of the lens element 6 is desired in many applications, for example if an auto-focus function is provided. The speed of response of the actuation is limited by the cooling of the lengths 42 of SMA wire 31. The cooling may be speeded up by reducing the thickness of the lengths 42 of SMA wire 31. For the size of cameras and wires under consideration, the cooling time changes approximately linearly with wire diameter. For this reason, the thickness of the lengths 42 of SMA wire 31 is desirably at most 35 μm to provide a response which is acceptable for an auto-focus application of the camera 1.

Figure 5:
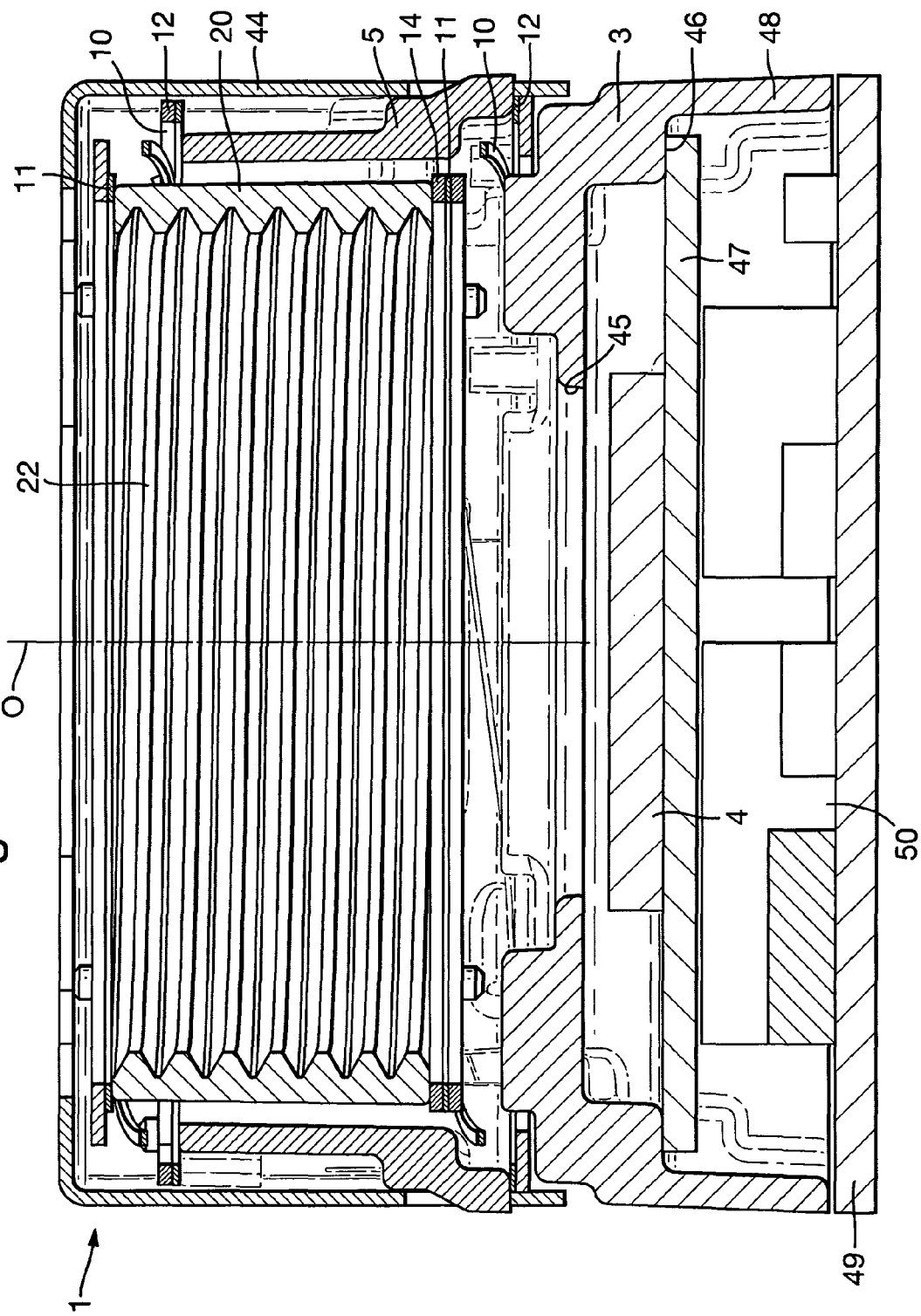
FIG. 5 is a detailed cross-sectional view of the camera.

FIG. 5 shows in detail the camera 1 except omitting the lens holder 21 for clarity. The additional components of the camera 1 beyond those shown in FIG. 2 will now be described.

The camera 1 has a screening can 44 clipped and bonded over the wall 5 of the support structure 2. The wall 5 is also bonded to the base 3 of the support structure 2. In the direction along the optical axis O, there are clearances between the lens element 6 and the screening can 44 and between the lens element 6 and the base 3 which allow sufficient movement of the lens element 6 along the optical axis O to provide for focussing of the image on the image sensor 4 whilst preventing a degree of movement which would damage the suspension system 9 or the lengths 42 of SMA wire 31. Thus the screening can 44 and the base 3 effectively form endstops for the movement of the lens element 6 along the optical axis.

In fact the base 3 has a more complicated construction than is shown schematically in FIG. 1. In particular the base 3 has a central aperture 45 behind which the image sensor 4 is mounted. For mounting of the image sensor 4, the base 3 has a ledge 45 formed to the rear of the aperture 45 and outside the area of the aperture 45. On the ledge 46 is mounted an image circuit board 47 on which the image sensor 4 is formed facing and aligned with the aperture 45 to receive light along the optical axis O. Optionally the aperture 45 may have an infrared filter fitted thereacross to improve the image quality, but also as a seal to prevent dust landing on the image sensor 4.

The base 3 further includes a protruding wall 48 disposed outside the ledge 46 and protruding rearwardly. A drive circuit board 49 is mounted on the protruding wall 48 and the drive circuit 50 is formed on that drive circuit board. As an alternative, it is possible to use an image circuit board 47 which is double-sided, with the drive circuit 50 mounted on its underside. Another alternative is to integrate the control circuit 50 into the same chip as the image sensor 4. Alternatively the same processing function could be carried out by another processor in the electronic device outside the camera 1, but already present for other purposes.

A camera of identical construction to the camera 1 is described in co-owned International Patent Application No. PCT/GB07/001,050 containing additional disclosure about the construction and manufacture which may be applied to the camera 1. Accordingly, International Patent Application No. PCT/GB07/001,050 is incorporated herein by reference.

The nature of the control circuit 50 and the control effected thereby will now be described.

Figure 6:
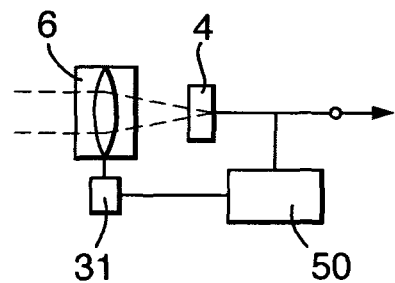
FIG. 6 is a schematic diagram of the overall control arrangement of the camera.

A schematic view of the overall control arrangement is shown in FIG. 6. The control circuit 50 is connected to the piece of SMA wire 31 and applies a current thereto to control the temperature of the piece of SMA wire 31 which moves the lens element 6 and changes the focus of the image formed on the image sensor 4. The output of the image sensor 4 is supplied to the control circuit 50 to be processed for determination of a measure of the quality of focus.

Figure 7:
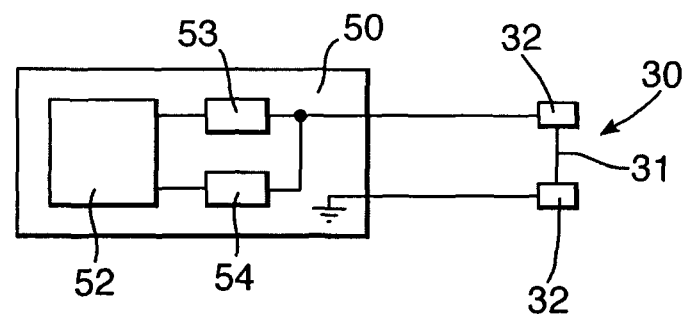
FIG. 7 is a diagram of the control circuit.

The control circuit 50 is shown in FIG. 7. The control circuit 50 is connected to each of the mounting members 32 which provide electrical connection to the piece of SMA wire 31 by means of the crimping thereof. The electrical connections 55 between the control circuit 50 and the mounting members 32 are formed by a conductive adhesive (e.g. silver-filled epoxy). It is undesirable to solder the control circuit 50 to the SMA actuator 30 because of potential damage caused by heating during the soldering process, or because of flux emissions caused by the soldering process.

The control circuit 50 supplies a current between the two mounting members 32. The control circuit 50 controls the degree of heating of the piece of SMA wire 31 by varying the power of the current flowing therethrough. The control circuit 50 varies the power of the current in response to the resistance of the piece of SMA wire 31 which is used as a measure of the position of the lens element 6. Other measures of position such as the temperature measured by a temperature sensor or a direct measure of the position of the lens element 6 output by a position sensor could be used, but a resistance sensor is advantageous because it does not increase the package size of the camera due to being implemented merely by additional components in the control circuit 50.

The physical phenomena behind the use of resistance are as follows.

On heating of the SMA, there is an increase of resistivity with temperature as for most materials. This occurs inside and outside the range of temperature over which the phase-change occurs (the phase transition range) and hence over which the SMA contracts. However inside the phase transition range two further effects occur. Firstly, the Austenite phase has a higher resistivity than the Martensite phase which tends to increase resistance with temperature. However, an opposing effect is that the change of geometry, involving a reduced length and increased cross-sectional area, tends to reduce resistance with temperature. This opposing effect is significantly greater than the other effects. Thus, during heating from low temperature, when the phase transition range is reached and the SMA starts to contract, after an initial rise of resistance the geometrical effect rapidly dominates with the result that during the major part of the contraction the resistance of the SMA actuator decreases. This occurs until the phase change has occurred in nearly all of the SMA so that the degree of contraction falls allowing the resistance to rise.

Figure 8:
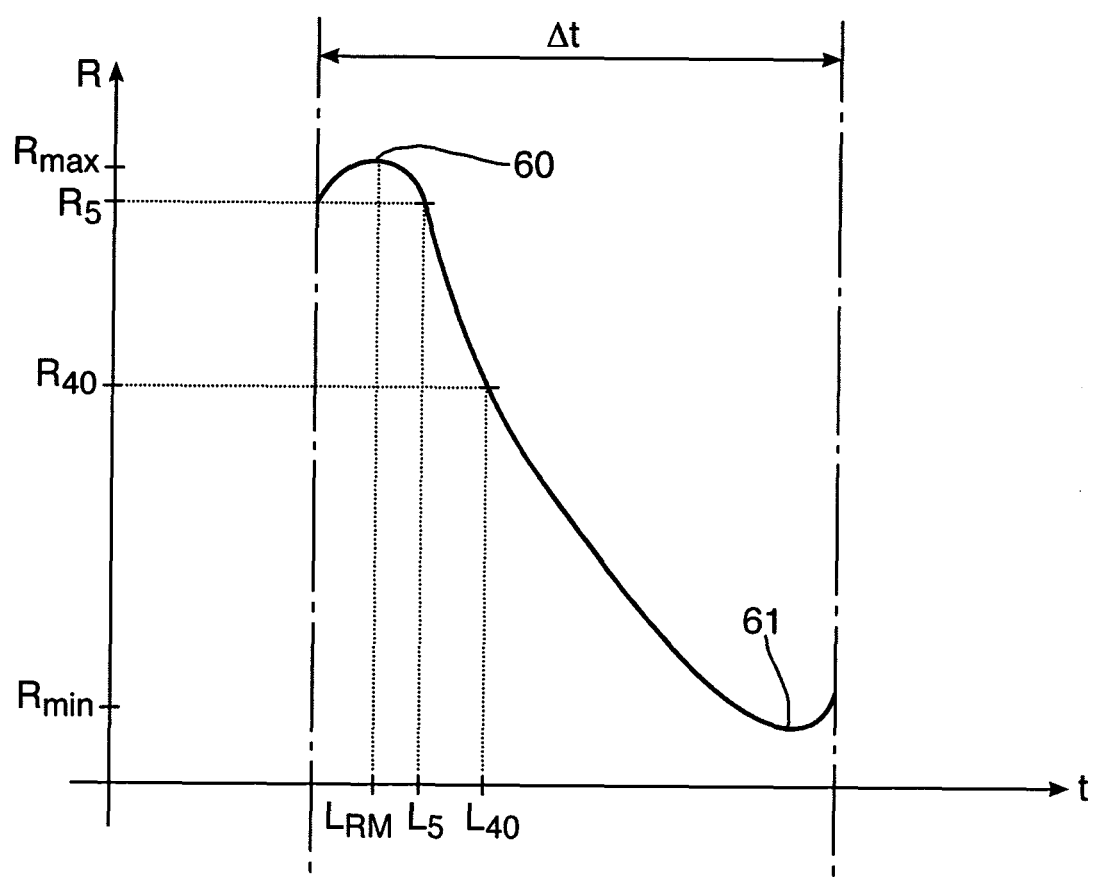
FIG. 8 is a graph of the resistance-length property of SMA during contraction.

Thus, SMA has a property that resistance varies with length during heating and contraction along a curve of the form shown in FIG. 8 which is a graph of resistance of the SMA against length of the SMA, corresponding to the position x of the lens element 6, the length increasing as the SMA contracts corresponding to increasing temperature. Thus across the phase transition range, the lens element 6 moves across a positional range $\Delta x$ due to the contraction of the SMA. The resistance rises across a small initial part of the positional range $\Delta x$ to a local maximum 60 having a resistance value Rmax. The resistance falls across the major part of the positional range $\Delta x$ to a local minimum 61 having a resistance value Rmin, whereafter the resistance rises across a small final part of the positional range $\Delta x$.

Due to this property of SMA material, the control circuit 50 implements control based on the measured resistance as follows. From an unheated state, the control circuit 50 heats the piece of SMA wire 31 until the local maximum resistance value is detected. This is used as an indication that contraction has started to occur. In fact a small amount of contraction has already occurred. However the local resistance maximum 60 can be easily detected, whereas the start of the positional range Δx cannot. Accordingly, the local resistance maximum 60 is used and this is so close to the start of the positional range Δx that the loss of movement is not significant.

Thereafter the control circuit 50 heats the piece of SMA wire 31 using the measured resistance as a measure of position. The local minimum resistance 61 is used to indicate the end of the positional range Δx. In fact, a small amount of contraction is still available. However the local minimum resistance 61 can be easily detected, whereas the end of the positional range Δx cannot. Accordingly, the local minimum resistance 61 is used. This is so close to the end of the of the positional range Δx that the loss of movement is not significant. Furthermore use of the positional range Δx above the local minimum resistance 61 can reduce the lifetime of the piece of SMA wire 31 as described further below.

The control circuit 50 uses pulse-width modulation (PWM). In particular, the control circuit 50 applies a pulse-width modulated current pulses (which may be of constant current or constant voltage) and varies the duty cycle in order to vary the power of the current applied and hence the heating. Use of PWM provides the advantage that the amount of power supplied may be accurately controlled with a fine resolution. This method provides a high signal-to-noise ratio, even at low drive power. The PWM may be implemented using known PWM techniques. Typically, the control circuit 50 will continually supply a pulse of current, for example with a duty cycle varying in the range from 5% to 95%. When the duty cycle is at a low value within this range, the average power in the piece of SMA wire 31 is low and so the wire cools even though some current is being supplied. Conversely, when the duty cycle is at a high value in the range, the piece of SMA wire 31 heats. The resistance is measured during the current pulse, for example after a short, predetermined delay from the start of the pulse.

During heating of the piece of SMA wire 31 from a cool state below the phase transition range, the resistance varies with position in the manner shown in FIG. 8 in a manner which is consistent from sample to sample and in successive heating cycles. However, during cooling the resistance changes along a curve of similar form but the variation of resistance is less repeatable from sample to sample and there is variable hysteresis as compared to the heating. This does not prevent the use of resistance as a measure of position during cooling altogether, but does reduce the accuracy of the control. This problem is avoided by the control circuit 50 following a predetermined and repeated motion in which positional control is only effected during heating of the sample as described below.

The control circuit 50 includes the following components.

The control circuit 50 includes a drive circuit 53 which is connected to supply current to the piece of SMA wire 31. The drive circuit 53 may be a constant-voltage current source or a constant-current current source. For example, in the latter case the constant current might be of the order of 120 mA.

The control circuit 50 further includes a detection circuit 54 arranged to detect the resistance of the SMA actuator 30.

In the case that the drive circuit 53 is a constant-current current source, the detection circuit 54 may be a voltage detection circuit operable to detect the voltage across the SMA actuator 30 which is a measure of the resistance of the piece of SMA wire 31.

In the case that the drive circuit 53 is a constant-voltage current source, the detection circuit 54 may be a current detection circuit.

For a higher degree of accuracy the detection circuit 54 may comprise a voltage detection circuit and a current detection circuit operable to detect the voltage and current across the SMA actuator and to derive a measure of resistance as the ratio thereof.

A difficulty is created by the resistance of the electrical connections 55, particularly as they are formed by conductive adhesive which has variable and quite large electrical resistance compared to solder, as well as having a significant temperature coefficient. The detection circuit 54 actually measures the total resistance of the SMA actuator 30 and the electrical connections 55. Thus the variable and temperature dependent resistance of the electrical connections 55 causes significant problems of precision when attempting to provide accurate positional control.

Figure 18:
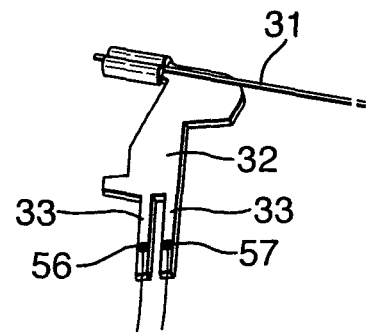
FIG. 18 is a a perspective view of a modified form of mounting member of the SMA actuator.
Figure 19:
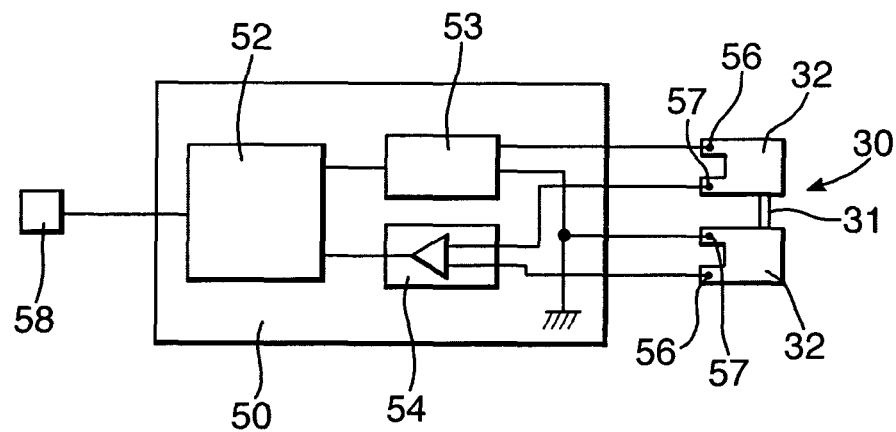
FIG. 19 is a diagram of a modified form of the control circuit.

This problem is overcome by modifying each mounting member 32 as shown in FIG. 18 and by modifying the control circuit as shown in FIG. 19, as will now be described.

Each mounting member 32 is provided with two separate terminals 33 arranged adjacent one another and protruding from the remainder of the mounting member 32 with a gap therebetween. Separate electrical connections 56 and 57 are made to each terminal, formed as before by conductive adhesive. The first electrical connection 56 of each mounting member 32 is connected to the drive circuit 53. The second electrical connection 56 of each mounting member 32 is connected to the detection circuit 54. Furthermore the detection circuit 54 is a voltage detection circuit operable to detect the voltage across the SMA actuator 30. This is used to provide a measure of the resistance of the SMA actuator 30. Preferably the drive circuit 53 is a constant-current current source so that the voltage across the SMA actuator 30 is a direct measure of resistance although alternatively a further detection circuit could be arranged to detect the current through the SMA actuator 30.

As the detection circuit 54 is a voltage detection circuit it draws much less current than the current supplied by the drive circuit 53, typically by a significant extent. For example, the input resistance of the detection circuit 54 is typically at least ten times the resistance of the SMA actuator 30 at 25° C. This means that the voltage dropped across the electrical connections 57 due to their resistance is lower than the voltage dropped across the electrical connections 55. Typically the resistance of the electrical connections 57 has a negligible effect. Thus the detection circuit 54 detects the voltage across the SMA actuator 50 precisely and independently of the resistance of the electrical connections 57. In this way, variation in the resistance can be excluded from the resistance measurement and thus precision positional control of the SMA actuator 30 achieved.

A controller 52 implemented by a suitable microprocessor controls the drive circuit 53 to supply a pulse-width modulated current. The controller 52 receives the resistance measured by the detection circuit 54 and performs the PWM control in response thereto.

Figure 9:
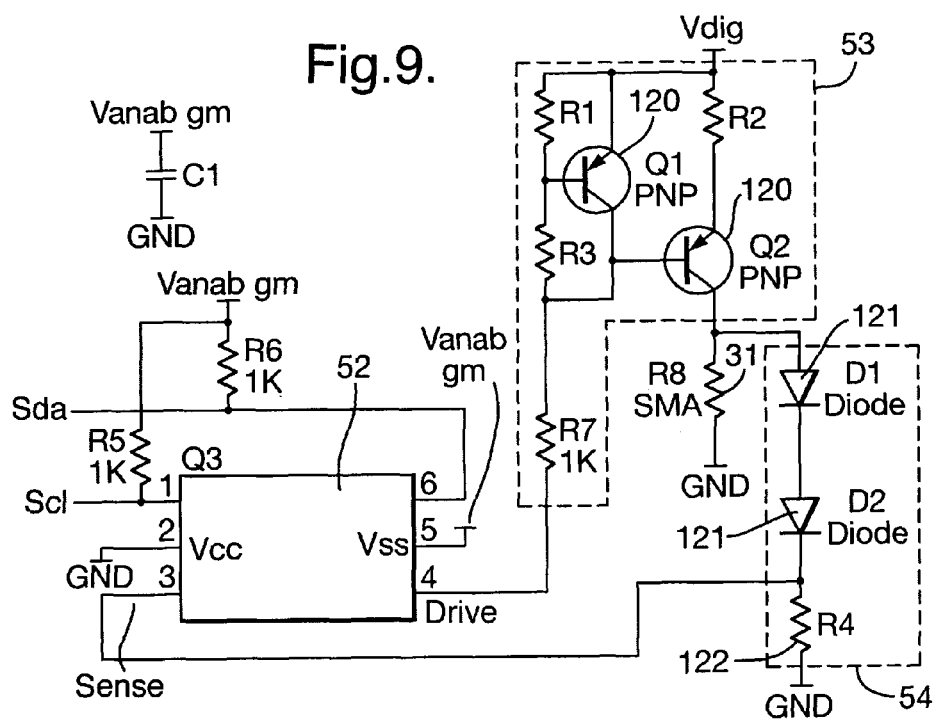
FIGS. 9 and 10 are diagrams of three possible circuit implementations for the control circuit.
Figure 10:
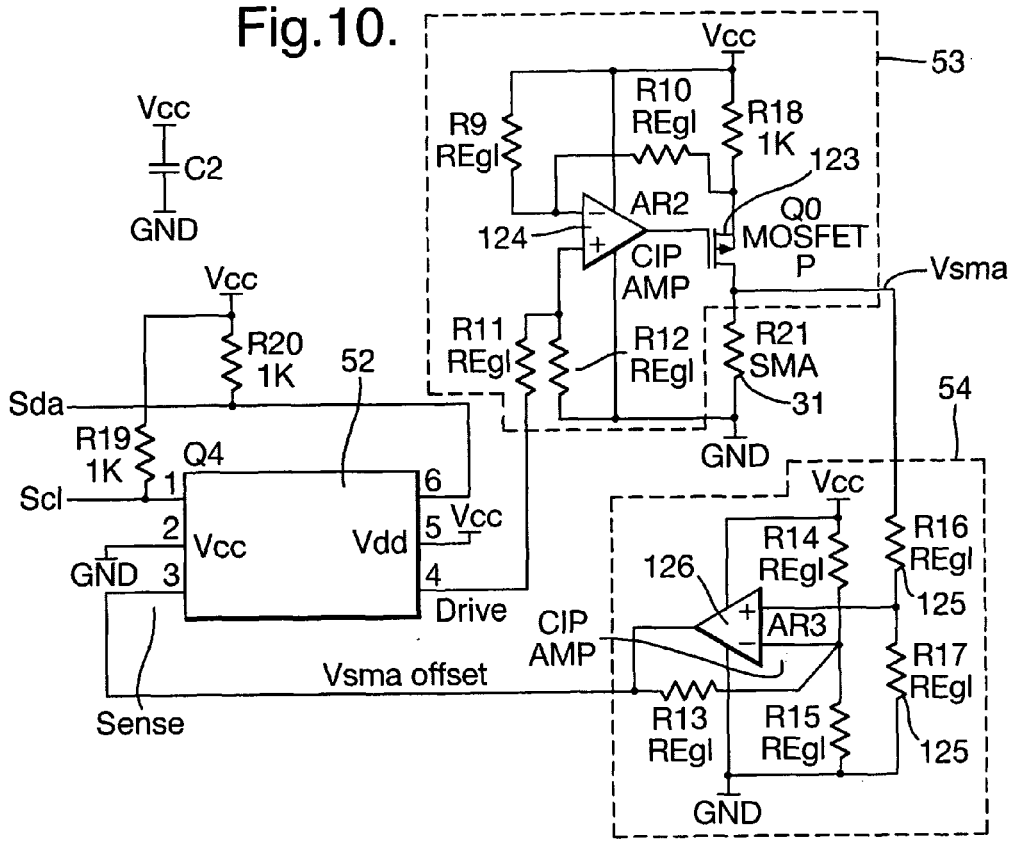

Three detailed circuit implementations for the control circuit 50 are shown in FIGS. 9 and 10.

The first circuit implementation of FIG. 9 is cheap but has limited performance. In particular, the drive circuit 53 is a constant-current current source implemented using a simple arrangement of bipolar transistors 120. The voltage detector circuit 54 is formed as a simple bridge arrangement of a pair of diodes 121 and a resistor 122.

The second circuit implementation of FIG. 10 is more accurate but is more expensive. In particular, the drive circuit 53 is a constant-current current source implemented by a MOSFET transistor 123 controlled by an operational amplifier 124. The detection circuit 125 is implemented by a bridge arrangement of two resistors 125, the output of which is amplified by an operational amplifier 126. The operational amplifier 126 allows the A/D convertor of the controller 52 to make use of its full dynamic range.

The control circuit 50 varies the power of the current using the measured resistance of the SMA actuator as a feedback signal to drive the measured resistance to a target value. In particular, the duty cycle of the pulse-width modulated current is varied. The controller 52 may implement a number of control algorithms to vary the duty cycle. One possibility is proportional control in which the duty cycle is varied by an amount proportional to the difference between the detected resistance and the target resistance. As the piece of SMA wire 31 heats across the active temperature region, the decrease in resistance is sensed and used in a feedback control technique. The stability of the feedback control is maintained by the inherent proportional-integral action of the piece of SMA wire 31 itself during heating. The overall feedback response is dominated by the response of the whole of the heating of the piece of SMA wire 31. Such a proportional control feedback loop provides for accurate control of position.

The piece of SMA wire 31 may have some non-linearities in its response. Such non-linearities may be limited by incorporating precompensation in the control circuit 50. One option is for the precompensation to consist of a gain or offset modifier on the output signal supplied to the drive circuit 53, for example based on the demand and the history of the demand signal. This is most beneficial if insufficient feedback is present to control the piece of SMA wire 31.

The control circuit 50 may implement an autofocus algorithm. In this case, the control may be based on a measure of the focus of the image, for example a modulation transfer function or a spatial frequency response, derived by the controller 52 from the image signal from the image sensor 4. A wide range of suitable measures are known and any such measure may be applied.

In this case, there is a limitation that the derivation of the measure of focus is slow. To combat this, during a scan across many focus positions, at the desired focus position determined from the measure of focus, the control circuit 50 may determine the resistance value. Then at the end of the scan the lens element 6 is driven back to the same position of the basis of that resistance value rather than the focus measure.

In this case, an image signal from the image sensor 4 is used to derive the primary feedback parameter, any drifting in the absolute values of the measure of the position as a secondary parameter over repeated cycles and age is irrelevant, as there is no perceivable change over the course of a single autofocus cycle. In a given camera 1, the resistance might vary from 10Ω at high temperature to 12Ω at low temperature, and then over the course of several 100 k cycles, this may change to 15Ω at high temperature and 20Ω at low temperature. However, for any given cycle, best focus will correspond to a specific resistance to a sufficient degree of accuracy. Thus it is only necessary to return to this specific resistance, irrespective of its absolute value.

Figure 11:
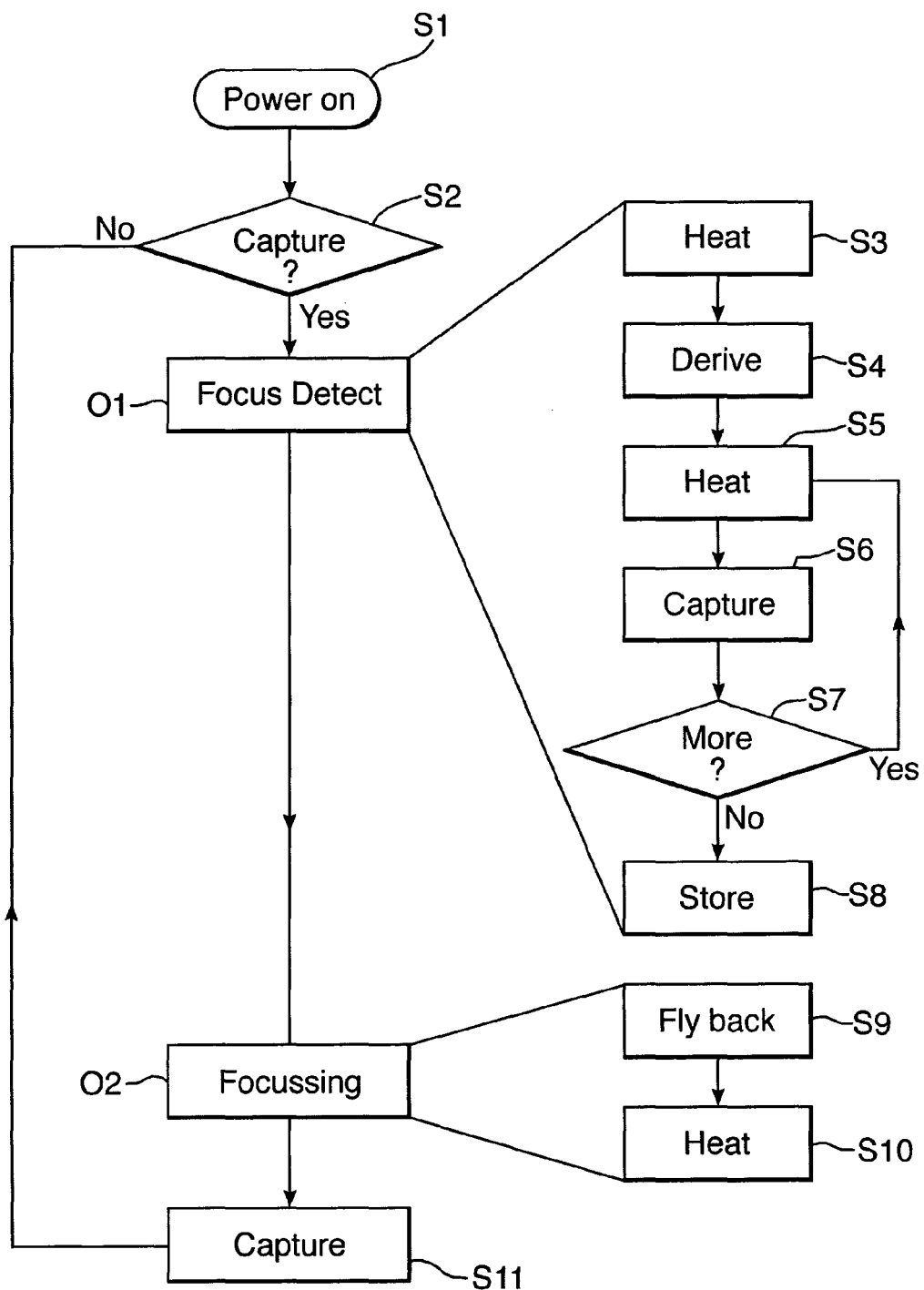
FIG. 11 is a flow chart of control algorithm implemented in the control circuit.

An example of a control algorithm which may be performed by the controller 52 is shown in FIG. 11 and will now be described. By way of illustration, reference is also made to FIG. 12 which illustrates an example of the change in resistance of the lens element 6 with time. This control algorithm uses the local maximum resistance 60 as a reference.

In step S1, power is supplied to the camera 1 and the control circuit 50. The unheated piece of SMA wire 31 is in the Martensite phase.

In step S2, a command to capture an image is awaited. After receiving the command, there is performed a focus detection operation O1, followed by a focussing operation O2.

The focus detection operation O1 comprises the following steps.

In step S3, the control circuit 50 heats the piece of SMA wire 31 from its unheated state. Initially the heating is achieved by the control circuit 50 supplying pulse-width modulated current with the maximum duty cycle. Thus the resistance rises as shown by the curve 71. As the heating continues, a local maximum resistance 72 is encountered, corresponding to the local resistance maximum 60 in FIG. 8.

During the heating, the controller 52 monitors the voltage across the piece of SMA wire 31 detected by the detector circuit 54 as a measure of the resistance of the piece of SMA wire 31 to detect the local maximum resistance 72.

Figure 12:
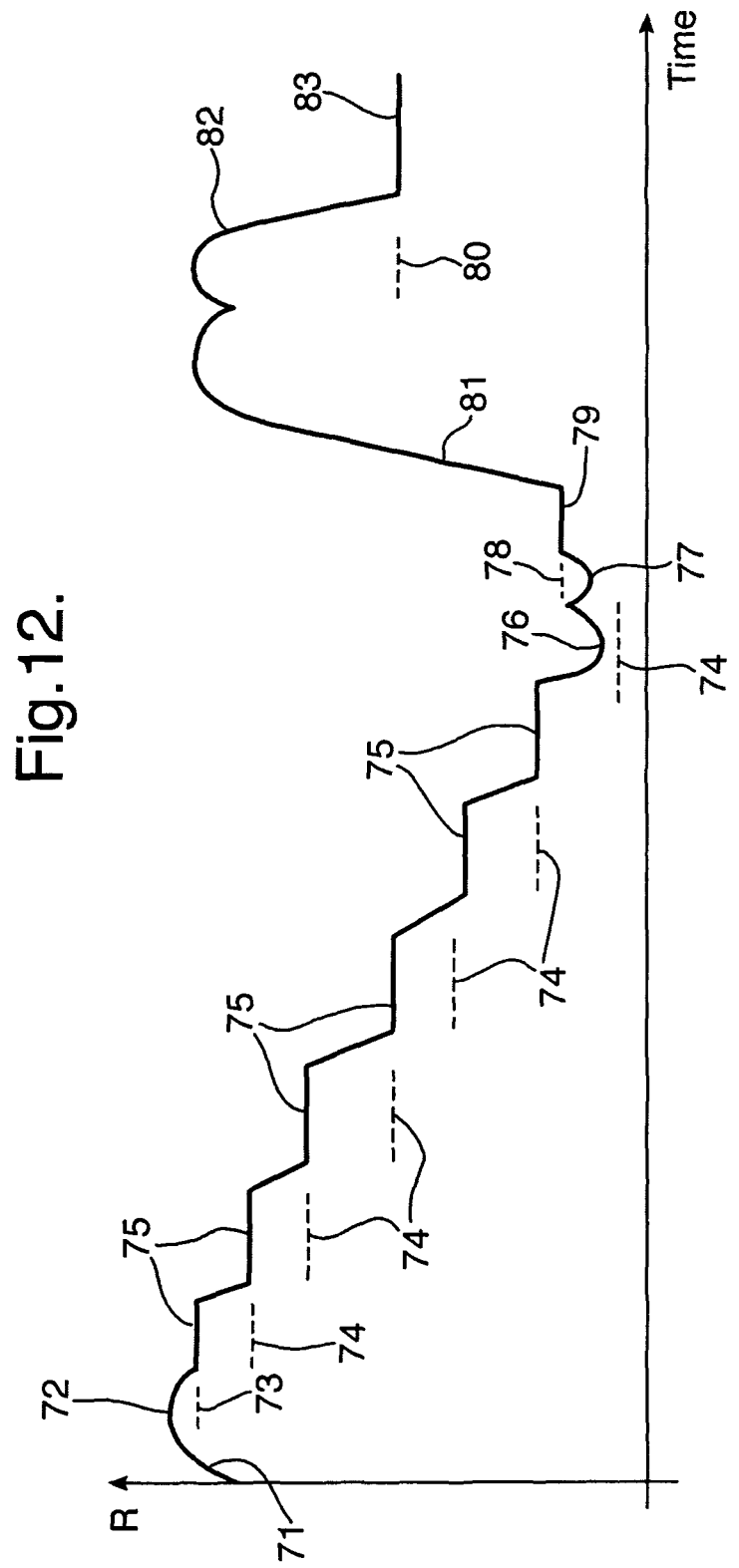
FIG. 12 is a graph of the resistance of the SMA over time with the control algorithm of FIG. 11.

On detection of the local maximum resistance 72, in step S4 there are derived a series of target values 73, 74. Firstly an upper target value 73 is derived from the resistance value of the detected local maximum resistance 72. The upper target value 73 may be the resistance value of the local maximum resistance 72 detected in step S3, but is more preferably that resistance value less a predetermined decrement where the greater slope of the curve shown in FIG. 8 allows for more accurate positional control. Then a predetermined number of further target values 74 at predetermined decrements below the upper target resistance value are derived. In FIG. 12, a limited number of further target values 74 are shown for ease of illustration, but in general there may be any number of target values 73, 74. Indeed a particular advantage of the camera 1 is that it is possible to achieve accurate positional control to a large number of positions.

The target values 73, 74 may be disposed linearly across the range, but there could alternatively be an unequal spread for example concentrated in a particular part of the range.

In steps S5 to S7, there is performed scanning across the series of target values 73, 74. This is achieved by setting in step S5 successive ones of the series of target values to the feedback control loop so that the piece of SMA wire 31 is heated to that one of the target values. Thus in FIG. 12, the resistance is driven to successive plateaus 75 each at the level of one of the target values 73, 74. As the target values 73, 74 successively decrease, the temperature of the piece of SMA wire 31 is raised monotonically.

When seeking the upper (initial) target value 73, step S5 may employ a "ratcheting" method as described below.

In addition, during the seeking of the further target values 74, step S5 may employ a safety routine as described below.

After the measured resistance has reached a given target value 73, 74 in step S5, then in step S6 an image is captured by the image sensor and a measure of the quality of the focus of the image signal output by the image sensor 4 is derived and stored in the memory of the controller 52.

In step S7, it is determined whether there are any remaining target values 74 in the series. If so, and provided the local resistance minimum has not been detected, the method returns to step S5 so that the process is repeated for each of the target values 73, 74. In this way, as the piece of SMA wire 31 is heated during the scanning, the quality of focus of the image signal is monitored.

The safety routine which forms part of step S5 will now be considered. The series of target values 73, 74 are intended all to be above the predicted resistance value of the local resistance minimum 61, based on the expected properties of the piece of SMA wire 31. However, there is a risk that a target value is below the actual resistance value of the local resistance minimum 61, for example due to manufacturing tolerances in the components of the camera 1 or physical changes in the SMA wire over its lifetime. If this does occur, then there is a possibility that as a result of the feedback loop, the controller 52 could cause the SMA to continue to be heated in an attempt to seek a target value 74 that is unattainable. This could damage the piece of SMA wire 31. Thus a safety routine is performed as part of step S5 in which the measured resistance is monitored to detect the local resistance minimum 76, corresponding to the local resistance minimum 61 in FIG. 8. If this is detected, then the controller 52 immediately reduces the power supplied to the piece of SMA wire 31. Then a new target value 78 is set a predetermined increment above the resistance value of the detected local resistance minimum 74.

FIG. 12 illustrates an example in which the final further target value 74 is below the actual resistance value of the local resistance minimum 76. In this case, the heating in step S5 to seek the final further target value 74 causes the local minimum resistance 76 to be reached. This is detected by the safety routine and the power is reduced which causes the resistance to fall back through another local minimum resistance 77. Thereafter a new target value 78 is set a predetermined increment above the detected local minimum resistance 76. The new target value 78 is set to the feedback control loop so that the piece of SMA wire 31 is heated to drive its resistance to a plateau 79 at the level of the new target value 78.

Furthermore, if the local resistance minimum 76 is detected, thereafter the remaining target values in the series are not used. Similarly, the resistance value of the detected local resistance minimum 76 is stored and thereafter in step S4, when a series of target values 73, 74 are derived any target values 73, 74 below the stored resistance value are rejected from the series.

In step S8, the stored measures of focus quality are used to derive a focus value of the control signal at which the focus quality is at an acceptable level. Most simply this is done by selecting one of the plurality of test values having the best measure of focus quality. As an alternative, it is possible to predict the value of the resistance which would provide the best focus from the test values using a curve-fitting technique. Thus the focus value need not be one of the test values. The curve fit may be a simple mathematic equation such as an Mth order polynomial where M>1 or instead could be chosen as a best-fit to a curve taken from a library of curves premeasured from representative scenes. The focus value is stored in the memory of the controller 52 for subsequent use. FIG. 12 illustrates an example for the stored focus value 80.

Instead of determining the focus value after steps S5 to S7, it could alternatively be determined on-the-fly during steps S5 to S7.

The focussing operation O2 comprises the following steps.

In step S9, flyback occurs. In particular, the control circuit 50 allows the piece of SMA wire 31 to cool back into the Martensite phase. This may be achieved by applying a pulse-width modulated current with a minimum duty cycle, although it could alternatively be achieved by applying no current at all. The transformation into the Martensite phase indicating the end of the flyback phase can be detected by the controller 52 monitoring the voltage measured by the detector circuit 54. Alternatively, the flyback phase can simply be maintained for a pre-determined time selected to be sufficiently long to allow the piece of SMA wire 31 to cool under any expected operating conditions. The flyback is shown by the curve 81 in FIG. 12.

Next, in step S10 the control circuit 50 heats the piece of SMA wire 31 to return it to the position corresponding to the focus value determined and stored in step S8. This is achieved by the control circuit 52 applying the feedback control technique with the stored focus value 80 being used as a target value so that the measured voltage across the piece of SMA wire 31 used as the feedback signal is driven to that stored focus value 80. The temperature rise is again monotonic, as in the focus detection operation O1. Thus in FIG. 12 during the heating the resistance changes as shown by the curve 82 and then is driven to a plateau 83 at the level of the stored focus value 80.

As discussed above, as a result of the flyback technique achieved by the inclusion of step S9, the focus value 80 is approached on the heating cycle and thus the problem of hysteresis in the piece of SMA wire 31 is overcome. Accordingly the lens element 6 is known to be at the position corresponding to the stored focus value 80.

As the image is now properly focussed, in step S11 an image is captured by the image sensor 4. The captured image is stored in a memory.

Figure 13:
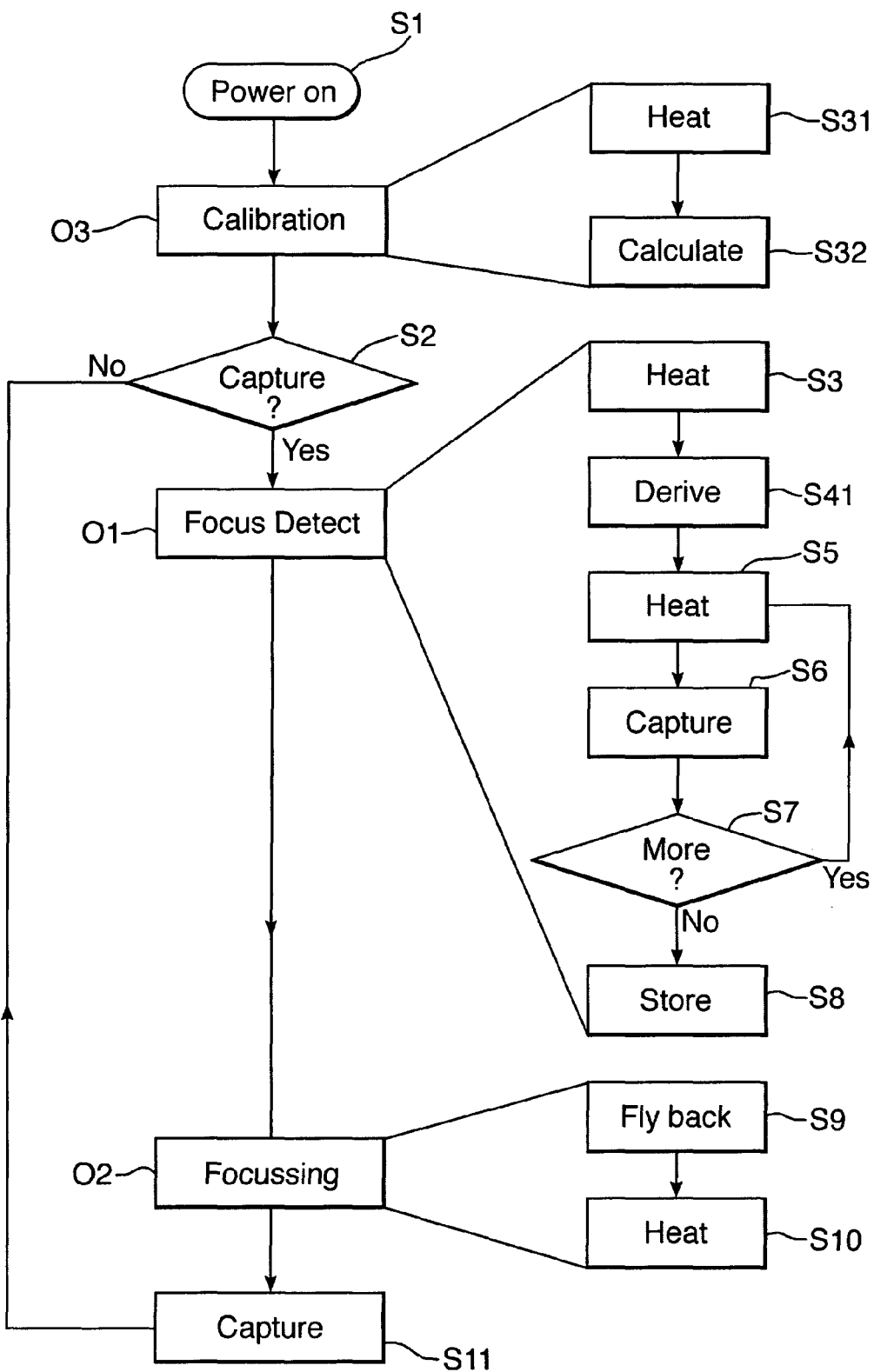
FIG. 13 is a flow chart of an alternative control algorithm.

An example of an alternative control algorithm which may be performed by the controller 52 is shown in FIG. 13 and will now be described.

In step S1, power is supplied to the camera 1 and the control circuit 50. The unheated piece of SMA wire 31 is in the Martensite phase.

Immediately after power-up, the control circuit performs a preliminary calibration operation O3 comprising the following steps.

In step S31, the control circuit 50 heats the piece of SMA wire 31 from its unheated martensite state. Initially the heating is achieved by the control circuit 50 supplying pulse-width modulated current with the maximum duty cycle. The controller 52 monitors the voltage across the piece of SMA wire 31 detected by the detector circuit 54 as a measure of the resistance of the piece of SMA wire 31. The resistance varies as described above, increasing, passing through a local maximum resistance 60 after the piece of SMA wire 31 starts to contract, decreasing and then reaching a local minimum resistance 61 as the contraction ceases.

During the heating in step S31, the local maximum resistance 60 and the local minimum resistance 61 are detected by the control circuit 50.

Once the local maximum resistance 60 is detected, the heating is achieved by setting a series of target values of successively lower resistance in the control loop. The initial (upper) target value is a predetermined decrement below the resistance value of the detected local maximum resistance 60. When seeking the initial target value, there may be employed a "ratcheting" method as described below.

Once the local minimum resistance 61 is detected, the heating is stopped and the piece of SMA wire 31 is allowed to cool. In this state there is applied either no current or else a pulse-width modulated current with the minimum duty cycle.

In step S32, there is derived a resistance range magnitude. The resistance range magnitude is stored in the memory of the controller 52, as subsequently it is to be used to derive the range of target values over which the piece of SMA wire 31 is to be heated. The resistance range magnitude is calculated as the difference between the resistance value of the detected local maximum resistance and the resistance value of the detected local minimum resistance, or that difference less a predetermined amount significantly less than the difference.

The latter is more typical as the upper and lower target values are usually set just inside the local maximum and minimum resistances where the greater slope of the curve shown in FIG. 8 allows for more accurate positional control with the feedback control loop.

In step S2, a command to capture an image is awaited. Thereafter there is performed a focus detection operation O1, followed by a focussing operation O2.

The focus detection operation O1 comprises the following steps.

In step S3, the control circuit 50 heats the piece of SMA wire 31 from its unheated state. This is identical to step S3 of the control algorithm of FIG. 11, as described above.

On detection of the local maximum resistance 60, in step S61 there are derived a series of target values for varying the resistance and hence the position between the local maximum resistance 60 and the local minimum resistance 61. This is equivalent to step S6 of the control algorithm of FIG. 11, as described above, except that the target values are derived in a different manner. An upper target value is derived as the resistance value of the local maximum resistance 60 detected in step S3, or more preferably as that resistance value less a predetermined decrement where the greater slope of the curve shown in FIG. 8 allows for more accurate positional control. The lower target value is derived as the upper target value less the resistance range magnitude stored in step S32. Intermediate target values are derived between the upper and lower target values. The target values may be disposed linearly across the range, but there could alternatively be an unequal spread for example concentrated in a particular part of the range.

Although the local minimum resistance 61 is not detected as part of the focus detection operation O1, its value is effectively predicted from the newly detected resistance value of the local maximum resistance 60 and the difference between the resistance values of the detected local maximum and minimum resistances derived in the calibration operation O3. As that difference is unlikely to drift significantly over the period of operation of the camera 1, this provides sufficient accuracy. Thus the lower target value is at or just above the resistance value of the local minimum resistance 61.

Thereafter the focus detection operation O1 consists of steps S5 to S8 which are identical to steps S5 to S8 of the control algorithm of FIG. 11, as described above.

The focussing operation O2 is identical to the focussing operation O2 of the control algorithm of FIG. 11, as described above.

In step S11 an image is captured by the image sensor 4. The captured image is stored in a memory.

Of course the order of the various steps performed in the methods of FIGS. 11 and 13 is merely an example and may be varied. For example, the focus detection operation O1 may be performed independently of the focussing operation O2 and the step S11 of capturing an image.

Figure 14:
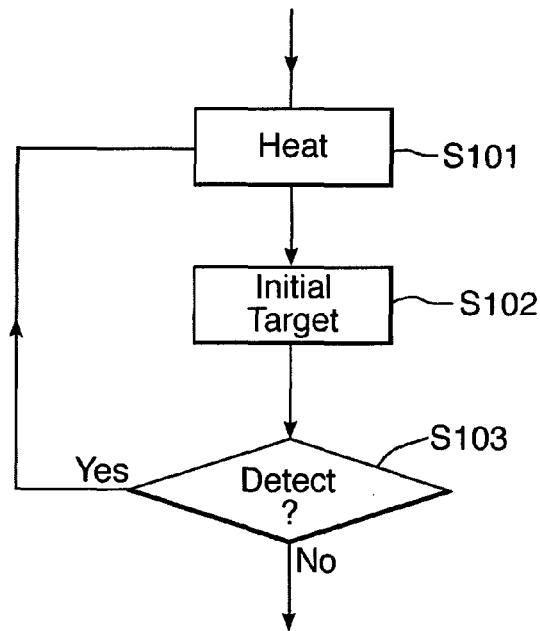
FIG. 14 is a flow chart of a "ratcheting" method implemented as part of the control algorithm

The "ratcheting" method referred to above is shown in FIG. 14 and will now be described. This method may be employed as part of step S2 and/or as part of step S5.

The purpose of the "ratcheting" method is to avoid a failure condition which can occur as follows. The equilibrium position of the piece of SMA wire 31 in its unheated state is generally thought of as a fixed position, taken to be the position where the forces generated in the piece of SMA wire 31 and the biassing forces from the suspension system 9 are balanced.

However in fact the equilibrium position can be affected by vibration or impacts of the actuation apparatus which can sometimes have the effect of stretching the piece of SMA wire 31 beyond its normal equilibrium position. In this circumstance, on the heating of the piece of SMA wire 31 a local maximum resistance is detected and subsequently in steps S2 and S5 there is set a target value a predetermined decrement below the resistance value of the detected local maximum resistance.

The failure condition occurs when the target value is greater than the resistance value of the local maximum resistance 60 which would have occurred if the piece of SMA wire 31 had not been stretched beyond its normal equilibrium position. This is the case if the degree of stretching is sufficiently great relative to the predetermined decrement used to derive the target value. In this case, as the target value is sought, initially the current is applied with a high duty cycle to heat the piece of SMA wire 31 causing the expected decrease in resistance because the heating causes the piece of SMA wire 31 to contract. As the target value is approached or overshot, the duty cycle is reduced. Normally this would cause the expected behaviour of causing the measured resistance to reduce to reach the target value. However as the piece of SMA wire 31 is still stretched beyond its normal equilibrium position there is still a contraction of the piece of SMA wire 31 causing a reduction in the measured resistance even when the power is reduced. This may prompt the power to be reduced further. Ultimately the control circuit 50 can reach a failure condition that the piece of SMA wire 31 is cooled to its minimum level.

The "ratcheting" method avoids this failure condition as follows.

In step S101, the control circuit 50 heats the piece of SMA wire 31 and monitors the measured resistance to detect the local maximum resistance, as before.

On detection of the local maximum resistance, in step S102 the control circuit 50 sets the target value a predetermined decrement below the resistance value of the detected local maximum resistance. Thereafter the control circuit 50 seeks to drive the measured resistance to the target value. Whilst this is happening, in step S103, the control circuit 50 monitors the power of the supplied current and the measured resistance to detect the condition that a decrease in the power of the supplied current is accompanied by the measured resistance decreasing. This is indicative of the failure condition described above. In response to detecting that condition, the method returns to step S101 and so the control circuit 50 heats the piece of SMA wire 31 to find a new local maximum resistance. This cycle is repeated until the target value set in step S102 is below the local maximum resistance 60 which would have occurred if the piece of SMA wire 31 had not been stretched beyond its normal equilibrium position. In this case the target value can be reached and so the operation proceeds as normal.

As discussed above the local maximum resistance 60 provides a reliable and repeatable measure of the start of contraction for an individual actuation apparatus. However, the tolerances inherent in the manufacture and assembly of the actuation apparatus result in uncertainty as to the absolute position of movable element when the resistance of the SMA actuator is at the local maximum resistance 60, as between different actuation apparatuses. Although the tolerances can be improved by careful design of the actuation apparatus, the tolerances cannot ever be entirely removed.

One solution to this problem is to change the position of the endstop formed by the base 3. As described above the endstop formed by the base 3 prevents excessive movement of the lens element 6 caused by impacts but does not contact the lens element 6 during normal operation. However the position of the endstop formed by the base 3 can instead be arranged to limit movement of the movable element to prevent extension of the piece of SMA wire 31 in its unheated state beyond a maximum length which is at or above the length corresponding on said curve to the local maximum resistance 60. In this case endstop formed by the base 3 limits the extension of the piece of SMA wire 31 and effectively lifts the lens element 6 to reduce the strain of the piece of SMA wire 31. During heating of the piece of SMA wire 31 the phase transformation initially occurs without causing contraction, until there is sufficient stress in piece of SMA wire 31 to move the lens element off the endstop. Thereafter movement is driven as though the endstop is not present. This means the position of the lens element 6 in the unheated state of the piece of SMA wire 31 is fixed by the position of the endstop.

This arrangement has the benefit that the starting position of the range of movement of the lens element 6 is controlled by the position of the endstop formed by the base 3. The endstop is positioned so that the maximum length of the piece of SMA wire 31 is at or below the length corresponding on the curve of FIG. 8 to the local maximum resistance 60 for the maximum overall tolerance on the position of the movable element relative to the support structure in all manufactured cameras 1. As the endstop may be positioned with a relatively good tolerance, this greatly improves the tolerances on the absolute starting position of the range of movement of the lens element 6.

This is illustrated in FIG. 8, noting that the length of the piece of SMA wire 31 increases as the position x of the lens element 6 decreases, and hence that the endstop prevents movement of the lens element 6 in a leftwards direction in FIG. 8. FIG. 8 shows the length $L_{RM}$ corresponding on the curve to the local maximum resistance 60. FIG. 8 also shows the lengths $L_5$ and $L_{40}$ corresponding on the curve to resistances which are below the resistance Rmax of the local maximum resistance 60 by amounts of, respectively 5% and 40% of the difference between the resistance Rmax of the local maximum resistance 60 and the resistance Rmin of the local minimum resistance 61. Thus the endstop is positioned to provide a maximum length for the piece of SMA wire 31 which is at the value of $L_{RM}$ or below (ie to the right in FIG. 8).

More preferably, the endstop may be positioned to provide a maximum length for the piece of SMA wire 31 which is at the value of $L_5$ or below (ie to the right in FIG. 8). This has the advantage of starting motion from a position where the greater slope of the curve shown in FIG. 8 allows for more accurate positional control.

However, changing the position of the endstop formed by the base 3 has the effect of reducing the available range of movement of the lens element 6 for at least some cameras 1. Typically, the endstop is positioned to provide a maximum length for the piece of SMA wire 31 which is at the value of $L_{40}$ or below (ie to the left in FIG. 8) in order to maintain a reasonably large range of movement. However, an alternative approach uses the adjustment provided by the two-part form of the lens element 6, as follows.

The camera 1 is assembled by first mounting the lens carrier 20 without the lens holder 21 in place and only subsequently mounting the lens holder 21 after all the various connections to the lens carrier 20 have been made. By use of the screw thread 22, it is possible to adjust the position of the lens system 7 along the optical axis O relative to the carrier 6 and hence relative to the image sensor 4. Such adjustment is made during assembly in order to accommodate any variations in the focal lengths and relative positions of the lenses 8 in the lens system 7 arising due to manufacturing tolerances.

Thereafter, the lens system 7 remains fixed in the same position relative to the lens carrier 20.

In particular, the position of the lens holder 6 is adjusted to provide focussing by the lens system 7 on the image sensor 4 of an image of an object at a distance in the range from infinity to the hyperfocal distance, ie far-field focus.

However it has been appreciated that a potential problem arises due to the fact that actuation is driven by change in temperature. This means that high ambient temperatures during use can cause the piece of SMA wire 31 to contract in its unheated state as compared to its state during manufacture. If the far-field focus is set on the basis of the temperature during manufacture, this can result during use at a higher ambient temperature in loss of part of the range of focus adjacent the far-field focus. To tackle this problem the adjustment of the position of the lens holder 6 is performed to provide a far-field focus when the piece of SMA wire 31 is heated to a predetermined temperature greater than ambient temperature. This may be achieved by actually heating the piece of SMA wire 31 when performing the adjustment or performing the adjustment having regard to the fact that the piece of SMA wire 31 will contract on such heating. As a result, focussing may be achieved across a range extending all the way to the far-field focus in all expected ambient temperatures.

Although the local maximum resistance 60 provides a reliable and repeatable measure of the start of contraction for an individual actuation apparatus, there remains a problem that variation in the position of the movable element at the time of detecting the local maximum resistance causes a corresponding variation in the position of the movable element during subsequent operation. This can result in variable positional control, particularly at high ambient temperatures when the position of the movable element corresponding to the local maximum resistance may vary.

In addition, there is a risk that the ambient temperature is high enough that the resistance has already passed the local maximum. In this case, the position of the first positional zone (focal zone in the case of a camera lens element) will alter. This means that over a temperature range, the controllable positions can alter in terms of the absolute actuator position. This is undesirable. For example in the case of an auto-focus algorithm for a camera lens element, where it is desired for the camera to move to the approximate far focus (infinity focus) position without referring to the image quality, this requires the actuator to be set with reasonable accuracy to an absolute position over the temperature range.

This problem may be reduced by using a control algorithm in which the local minimum resistance 61 is used as a reference instead of the local maximum resistance. It has been observed that the position at the local minimum resistance 61 is stable as compared to the position at the local maximum resistance 62. In particular, this position does not vary with ambient temperature. This is because the temperature of the SMA at the local minimum resistance is well outside the ambient temperature range, and so the actuator position corresponding to the local minimum resistance also does not vary over the operating temperature range. This allows accurate positioning and hence accurate focussing control.

Figure 15:
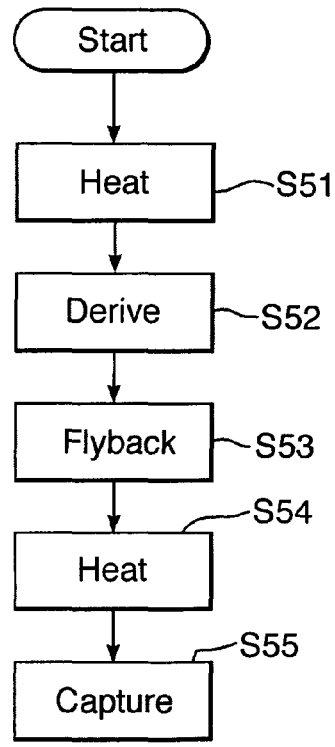
FIG. 15 is a flow chart of an alternative control algorithm.

An example of an alternative control algorithm using the local minimum resistance 61 as a reference and which may be performed by the controller 52 is shown in FIG. 15 and will now be described. This is a simple control algorithm in which the lens is taken to a focus zone demanded by the user.

Initially, the piece of SMA wire 31 is unheated and therefore in the Martensite phase.

In step S51, the control circuit 50 heats the piece of SMA wire 31 from its unheated state. Initially the heating is achieved by the control circuit 50 supplying pulse-width modulated current with the maximum duty cycle. During the heating, the resistance of the piece of SMA wire 31 moves along the curve shown in FIG. 8. The controller 52 monitors the voltage across the piece of SMA wire 31 detected by the detector circuit 54 as a measure of the resistance of the piece of SMA wire 31 to detect the local minimum resistance 61.

On detection of the local minimum resistance 61, in step S52 a target value is derived from the detected resistance value of the local minimum resistance 61. In particular the target value is derived a predetermined increment above the detected resistance value of the local minimum resistance 61. The size of the predetermined increment is dependent on the focus zone demanded by the user.

In step S53, flyback occurs. In particular, the control circuit 50 allows the piece of SMA wire 31 to cool back into the Martensite phase. This may be achieved by applying a pulse-width modulated current with a minimum duty cycle, although it could alternatively be achieved by applying no current at all. The transformation into the Martensite phase indicating the end of the flyback phase can be detected by the controller 52 monitoring the voltage measured by the detector circuit 54. Alternatively, the flyback phase can simply be maintained for a pre-determined time selected to be sufficiently long to allow the piece of SMA wire 31 to cool under any expected operating conditions.

In step S54, the control circuit 50 heats the piece of SMA wire 31, controlling the power by setting the target value derived in step S52 to the feedback control loop so that the piece of SMA wire 31 is heated to that target value. As the position at the local minimum resistance 61 is stable and does not vary with temperature, the focus achieved when the piece of SMA wire 31 reaches the target value is reliable and repeatable.

As the image is now properly focussed, in step S55 an image is captured by the image sensor 4. The captured image is stored in a memory.

Figure 16:
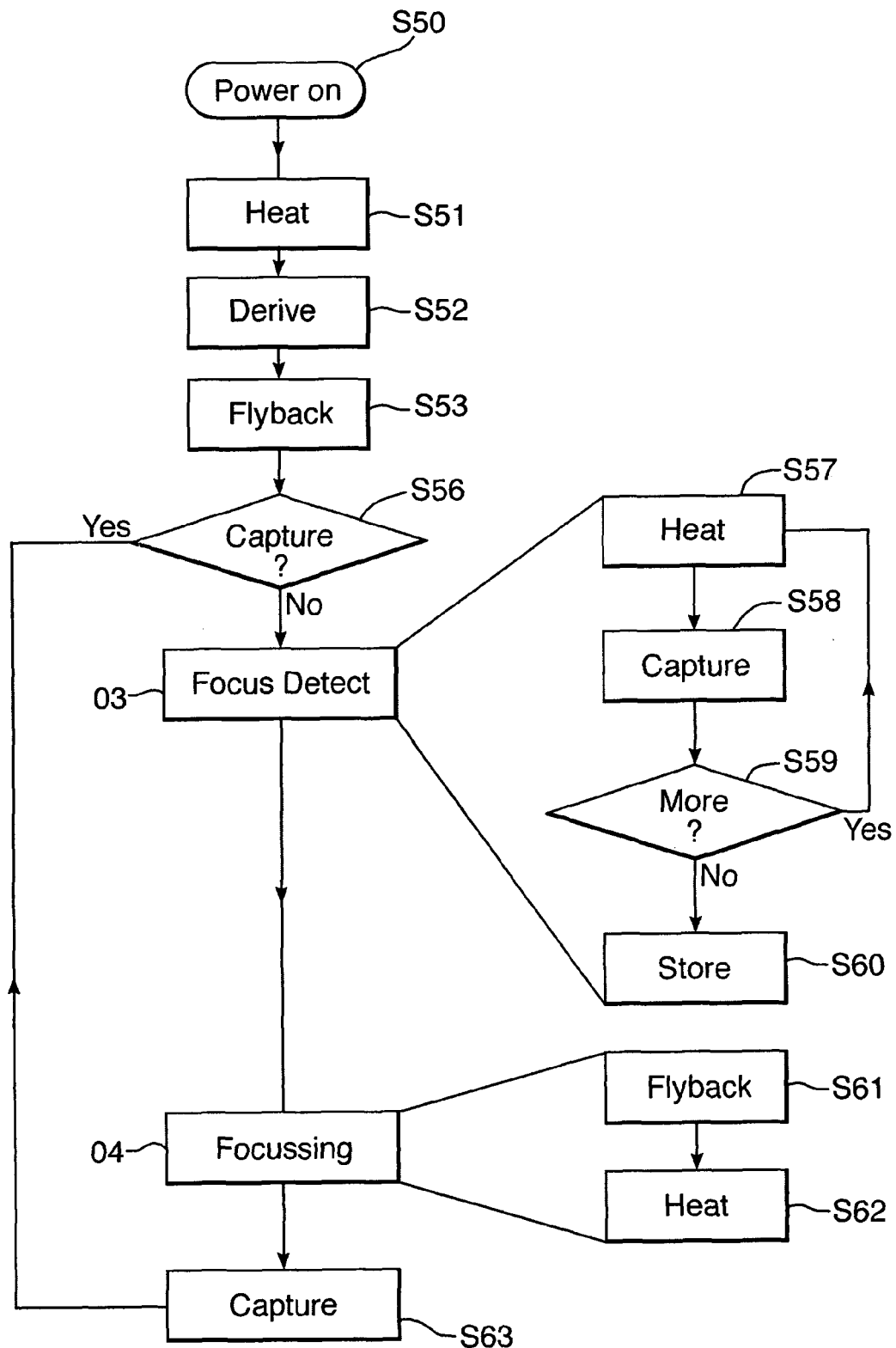
FIG. 16 is a flow chart of a modified alternative control algorithm.

The control algorithm of FIG. 15 may be modified to provide an autofocus control algorithm as shown in FIG. 16 and which will now be described. By way of illustration, reference is also made to FIG. 17 which illustrates an example of the change in resistance of the lens element 6 with time.

In step S50, power is supplied to the camera 1 and the control circuit 50. The unheated piece of SMA wire 31 is in the Martensite phase.

In step S51, the control circuit 50 heats the piece of SMA wire 31 by supplying pulse-width modulated current with the maximum duty cycle. The controller 52 monitors the voltage across the piece of SMA wire 31 detected by the detector circuit 54 as a measure of the resistance of the piece of SMA wire 31 to detect the local minimum resistance 90.

On detection of the local minimum resistance 90, in step S52 a series of target values 91 are derived from the detected resistance value of the local minimum resistance 90. In particular each target value 91 is derived a respective predetermined increment above the detected resistance value of the local minimum resistance 91. In general there may be any number of target values 91. Indeed a particular advantage of the camera 1 is that it is possible to achieve accurate positional control to a large number of positions. The target values 91 may be disposed linearly across the range, but there could alternatively be an unequal spread for example concentrated in a particular part of the range.

In step S53, flyback occurs as described above with reference to FIG. 15. The resistance rises as shown by the curve 92 in FIG. 17.

In step S56, a command to capture an image is awaited. After receiving the command, there is performed a focus detection operation O3, followed by a focussing operation O4.

The focus detection operation O3 comprises the following steps.

In step steps S57 to S59, there is performed scanning across the series of target values 91. This is achieved by setting in step S57 successive ones of the series of target values 91 to the feedback control loop so that the piece of SMA wire 31 is heated to that one of the target values 91. Thus in FIG. 17, the resistance is driven to successive plateaus 93 each at the level of one of the target values 91. As the target values 91 successively decrease, the temperature of the piece of SMA wire 31 is raised monotonically.

When seeking the initial target value 91, step S57 may employ a "ratcheting" method as described previously.

After the measured resistance has reached a given target value 91 in step S57, then in step S57 an image is captured by the image sensor 4 and a measure of the quality of the focus of the image signal output by the image sensor 4 is derived and stored in the memory of the controller 52.

In step S59, it is determined whether there are any remaining target values 91 in the series. If so, the method returns to step S57 so that the process is repeated for each of the target values 91. In this way, as the piece of SMA wire 31 is heated during the scanning, the quality of focus of the image signal is monitored.

Figure 17:
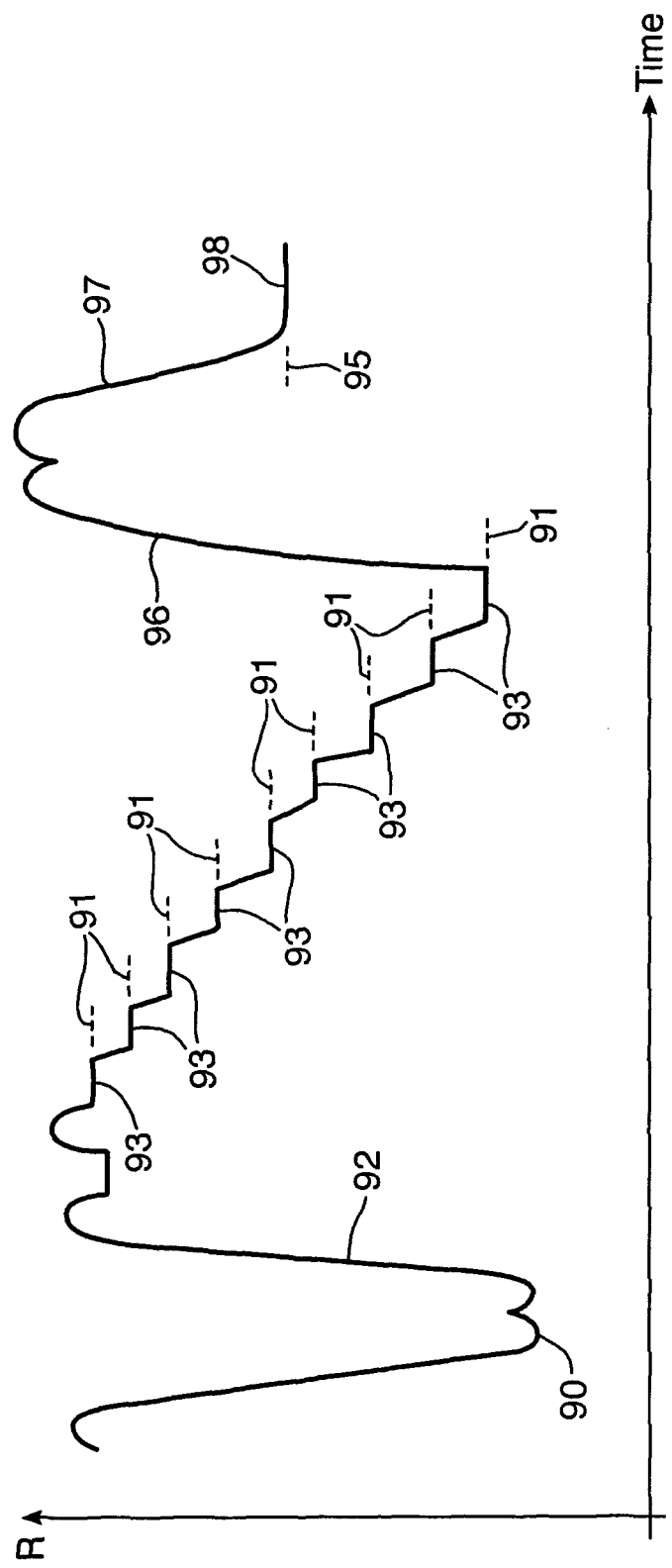
FIG. 17 is a graph of the resistance of the SMA over time with the control algorithm of FIG. 11.

In step S60, the stored measures of focus quality are used to derive a focus value of the control signal at which the focus quality is at an acceptable level. Most simply this is done by selecting one of the plurality of test values having the best measure of focus quality. As an alternative, it is possible to predict the value of the resistance which would provide the best focus from the test values using a curve-fitting technique. Thus the focus value need not be one of the test values. The curve fit may be a simple mathematic equation such as an Mth order polynomial where M>1 or instead could be chosen as a best-fit to a curve taken from a library of curves premeasured from representative scenes. The focus value is stored in the memory of the controller 52 for subsequent use. FIG. 17 illustrates an example for the stored focus value 95.

Instead of determining the focus value 95 after steps S57 to S59 it could alternatively be determined on-the-fly during steps S57 to S59.

The focussing operation O4 comprises the following steps.

In step S61, flyback occurs as described above for step S53. The resistance rises as shown by the curve 96 in FIG. 17.

Next, in step S10 the control circuit 50 heats the piece of SMA wire 31 to return it to the position corresponding to the focus value 95 determined and stored in step S60. This is achieved by the control circuit 52 applying the feedback control technique with the stored focus value 95 being used as a target value so that the measured voltage across the piece of SMA wire 31 used as the feedback signal is driven to that stored focus value 95. The temperature rise is again monotonic, as in the focus detection operation O3. Thus in FIG. 17 during the heating the resistance changes as shown by the curve 97 and then is driven to a plateau 98 at the level of the stored focus value 95.

As discussed above, as a result of the flyback technique achieved by the inclusion of step S61, the focus value 95 is approached on the heating cycle and thus the problem of hysteresis in the piece of SMA wire 31 is overcome. Accordingly the lens element 6 is known to be at the position corresponding to the stored focus value 95

As the image is now properly focussed, in step S63 an image is captured by the image sensor 4. The captured image is stored in a memory.

Another issue is the lifetime of the piece of SMA wire 31. SMA wire must be treated carefully during electrical driving to ensure longevity. A correctly driven SMA wire should last hundreds of thousands of cycles. The camera 1 will normally be required to survive a given lifetime, typically around 300,000 cycles or perhaps more. If the SMA wire is driven incorrectly, it will become damaged and either fracture or perform out of specification before the end of its lifetime.

One cause of damage will now be described with reference to FIG. 8 showing the resistance-length curve for SMA material. At the high end of the positional range Δx and in particular above the local minimum resistance 61, the majority of the SMA material has transformed from the Martensite phase to the Austenite phase. This non-uniform effect of incomplete transition at a given temperature is due to the statistical spread of transition temperature in the SMA crystal structure. Further heating can provide further contraction but the load is borne by relatively few SMA crystals. These portions of the SMA material become relatively heavily loaded which results in damage to their structure. With repeated operation in this region, this damage may be exacerbated to the point where the piece of SMA wire 31 might either fracture or perform out of specification before the desired lifetime of the SMA actuator has been reached.

Therefore a number of techniques may be applied to limit the risk of such damage.

A first approach is to prevent the local minimum resistance 60 being reached or passed. This can be achieved by reducing the displacement performance of the camera 1. However, reducing the displacement of the camera 1 may reduce the performance specification to an unacceptable level. This effect may be addressed by reducing the rest length of the lengths 42 of SMA wire 31 to increase its strain when assembled in the camera 1. The effect of shortening the lengths 42 of SMA wire 31 and increasing the strain in its rest state will result in greater percentage length reduction of the wire for a given temperature increase. This results in greater nominal movement of the lens element 6 for a given temperature increase. So the increase in temperature may be limited to a level to prevent the local minimum resistance 61 being reached. This is achieved by specifying a maximum change in resistance from the local maximum resistance, which is at a safe value for all cameras 1 at the limits of manufacturing tolerances.

However, care must be taken when using this approach having regard to the endstop provided by the screening can 44. If the lens element 6 contacts that end-stop during heating, damage to the piece of SMA wire 31 is extremely likely. This may occur during a failure condition of the control circuit 50 where maximum power drive current is input continuously. Therefore, it might be necessary to move the endstop provided by the screening can 44 further away but that is undesirable because of increases in product size or decrease in the protection of the flexures 13.

The safety routine in step S5 of the control algorithm described above also prevents the piece of SMA wire 31 from being exposed to states above the local minimum resistance 61 for anything more than a brief period by reducing the power as soon the local minimum resistance is detected.

It is important to ensure there is no failure mode of the control circuit 50 which would allow the maximum power drive current to be input continuously. It is not an optimum solution to simply limit the maximum power drive current to a safe (continuous) operating level, as this can greatly reduce the maximum rate of heating. Alternatively, if it is undesirable to rely on fail-safe electronics, a switch may be introduced at a position similar to that of the endstop to remove power. This however may not prevent damage to other constituent components within the camera module.

Another case where the lens element 6 may travel too far and cause breakage of the piece of SMA wire 31 is during operation at elevated ambient temperatures. In the case of operation at elevated temperatures, such as more than around 50° C., the piece of SMA wire 31 might never cool and contract sufficiently after operation to return past the local maximum resistance 60. In this case the initial stage of heating the piece of SMA wire 31, eg in step S5 of FIG. 13, the heating may be performed continuously without detecting the local maximum resistance 60 until the lens element contacts the end stop formed by the screening can 44 thereby causing damage.

To prevent this occurring, the control circuit 50 detects and stores the resistance value of the local maximum resistance 60 at first use. If the resistance is detected to reduce with wire heating (ie due to an elevated ambient temperature) control circuit 50 limits displacement to the resistance value of the sum of the resistance value of the local maximum resistance 60 and the chosen resistance change value for maximum displacement. If the resistance is detected to reduce with heating at first use, the control circuit 50 should abort the control algorithm and instead cool the piece of SMA wire 31. This will continue to be the case until the ambient temperature conditions are such that the local maximum resistance 60 can be detected.

A second approach is to allow the local minimum resistance 61 to be reached but to reduce the amount and/or frequency at which this occurs.

Limiting heating beyond the local minimum resistance 61 by as small amount as possible may be achieved by using an Analogue to Digital Converter (ADC) with a high resolution. This allows the increment of measurable resistance change to be as small as possible. The Least Significant Bit (LSB) determines the size of this measurable resistance increment. So the LSB should be made as small as possible with a high resolution ADC and the maximum permitted number of LSBs past the point of minimum resistance should be as small as possible, without incurring an unacceptable Signal to Noise Ratio (SNR). An unacceptably high SNR may cause the camera to behave unpredictably by mistakenly detecting an erroneous resistance value past local minimum resistance 61.

Limiting the frequency of heating beyond the local minimum resistance 61 may be achieved by reducing the number of occasions the camera 1 measures and characterises the maximum and minimum wire resistance. This is achieved in the alternative control algorithm of FIG. 13 by the use of the preliminary calibration operation O3 to derive the resistance range magnitude. Thus, during the focus detection operation O1, the piece of SMA wire 31 is not heated beyond the local minimum resistance 61. The preliminary calibration operation O3 is only performed on power-up and so is performed less frequently than the focus detection operation O1 which is performed on each image capture. Thus, the SMA actuator is heated less frequently beyond the local minimum resistance 61 as compared to the situation that the local minimum resistance 61 is reached every time the focus detection operation is performed.

Alternatively, the control circuit 50 may implement an automacro function in which the lens element 6 is driven to one of two positions, that is a far-focus position and a macro position.

In the far-focus position, the lens element 6 is in its closest position to the image sensor 4 within its range of movement and the lens element 6 provides a far-field or hyperfocal focus on the image sensor 4. In the macro position, the lens element 6 is in its furthest position from the image sensor 4 within its range of movement and the lens element 6 provides a close-field focus on the image sensor 4.

To select the far-focus position, the drive circuit 50 supplies a first drive signal of no current to the SMA wire 31 (or alternatively a very low current insufficient to cause contraction of the SMA wire 31, although this undesirably increases power consumption). In this case, the SMA wire 31 applies less force than the biassing force provided by the suspension system 9. The SMA wire 31 may be slack. The suspension system 9 is arranged to bias the lens element 6 against the end-stop formed by the base 3 which therefore limits the movement and determines the position of the lens element 6 in the far-focus position. No power is consumed in the far-focus position which is the most common setting for the camera 1.

To select the macro position, the drive circuit 50 supplies a second drive signal of sufficient power to contract the SMA wire 31 with more force than the biassing force provided by the suspension system 9, so as to drive the lens element 6 to a position governed by the degree of contraction. Power is consumed continuously in the far-focus position.

When implementing an automacro function, the drive circuit 50 can be constituted very simply and cheaply, for example by arranging the drive circuit 53 as a source which is simply switched on and off to control the movement, for example using a semiconductor switch (e.g. a FET or a BFT). The detection circuit 54 can in some arrangements be omitted. Some options for implementing the automacro function are as follows.

The simplest embodiment is for the second drive signal to be a fixed, constant current, typically having a magnitude of between 10 mA and 100 mA depending on the configuration of the SMA actuator 30. For thin wires of size of order 25 µm diameter, a current of around 30 to 50 mA would be typical, but this would vary depending upon what ambient temperature the current was trimmed for.

In many types of portable electronic device such as a telephone in which the camera 1 may be employed, a constant current source (often adjustable by a digital value from a processor) is already available as such sources are often used to drive VCM lens positioners, and this may thus be used without adding extra electronics cost to the device. This simple embodiment is very cheap to implement but gives poor focus position repeatability with different SMA actuators 30 (but better repeatability than a fixed voltage drive would give), and poor positional accuracy over ambient temperature variations. The time to stabilise at a given focus position at a given ambient temperature will also be quite long because of the exponential nature of the electroresistive self heating of the SMA wire 31.

In another embodiment, the controller 52 receives a temperature signal indicative of the ambient temperature from a temperature sensor 58. Such a temperature signal is frequently available within a portable device such as mobile telephone system as a simple digital number representing internal ambient temperature in some arbitrary and not necessarily linearly scaled units. The controller 52 controls the drive circuit 53 to vary the power of the second drive signal, for example by controlling magnitude of the current, in response to the ambient temperature. In particular, the power of the second drive signal is reduced as ambient temperature increases. In this manner open-loop temperature compensation of the position of the lens element 6 is achieved which will greatly improve the repeatability over a range of ambient temperatures, even using a temperature signal having coarse resolution. Significant variation in the contraction of the SMA actuator 30 is caused by variation in the ambient temperature, this changing the rate of cooling of the SMA actuator 30 and hence the resultant temperature.

The functional relationship between a given value of the temperature signal and the second drive signal is derived by, experiment or theory or both, prior to the design of the camera 1. During operation variation is achieved in accordance with this functional relationship, for example by computation, or using a look-up table. This can require no extra complexity of the drive circuit 53 and only a small amount of processing by the controller 52.

Alternatively an automacro function can be implemented using the resistance of the SMA actuator 30 as a measure of position as described above, in order to move the lens element 6 to a predetermined position. However, in general terms this requires additional complexity in the control circuit 50 which goes against the benefit of using an automacro function.

Whilst the embodiments described above relate to a camera incorporating an SMA actuation arrangement which drives movement of a camera lens element, the SMA actuation arrangements described can equally be adapted to drive movement of an object other than a camera lens element.

The invention claimed is:

1. A shape memory alloy actuation apparatus comprising:
a support structure;
a movable element supported on the support structure by a suspension system which guides movement of the movable element;
a shape memory alloy actuator connected between the support structure and the movable element such that contraction of the shape memory alloy actuator on heating drives said movement of the movable element relative to the support structure, the shape memory alloy actuator having a property that resistance varies with length along a curve on which the resistance decreases from a local maximum resistance to a local minimum resistance during contraction; and
an endstop arranged to limit movement of the movable element to prevent extension of the shape memory alloy actuator in its unheated state beyond a maximum length which is at or below the length corresponding on said curve to a resistance below the resistance of the local maximum resistance by a predetermined amount of the difference between the resistance of the local maximum resistance and the resistance of the local minimum resistance.

2. A shape memory alloy actuation apparatus according to claim 1, wherein said predetermined amount of the difference between the resistance of the local maximum resistance and the resistance of the local minimum resistance is 5% of the difference between the resistance of the local maximum resistance and the resistance of the local minimum resistance.

3. A shape memory alloy actuation apparatus according to claim 1 or 2, wherein the maximum length is at or above the length corresponding on said curve to a resistance below the resistance of the local maximum resistance by an amount of 40% of the difference between the resistance of the local maximum resistance and the resistance of the local minimum resistance.

4. The shape memory alloy actuation apparatus according to claim 1, wherein the movable element is a camera lens element, the suspension system guiding movement of the camera lens element relative to the support structure along the optical axis of the camera lens element.

5. The shape memory alloy actuation apparatus according to claim 4, wherein the camera lens element includes one or more lenses having a diameter of at most 10 mm.

6. The shape memory alloy actuation apparatus according to claim 1, further comprising a biasing arrangement arranged to provide biasing of the movable element relative to the support structure in an opposite direction from the movement driven by contraction of the shape memory alloy actuator.

7. The shape memory alloy actuation apparatus according to claim 1, wherein the suspension system is arranged to provide biasing of the movable element relative to the support structure in an opposite direction from the movement driven by contraction of the shape memory alloy actuator.

8. The shape memory alloy actuation apparatus according to claim 7, wherein the suspension system comprises a plurality of resilient flexures coupled between the movable element and the support structure, the flexures being flexed to provide said biasing.

9. The shape memory alloy actuation apparatus according to claim 1, wherein the shape memory alloy actuator comprises at least one length of shape memory alloy wire connected in tension between the support structure and the movable element.

* * * * *